(12) United States Patent (10) Patent No.: US 6,867,514 B2
Fecera (45) Date of Patent: Mar. 15, 2005

(54) PERMANENT MAGNET MOTOR

(76) Inventor: Frank J. Fecera, 111 Quaker Hill Rd., Morgantown, PA (US) 19543

( * ) Notice: Subject to any disclaimer, the term of this patent is extended or adjusted under 35 U.S.C. 154(b) by 0 days.

(21) Appl. No.: 10/935,381

(22) Filed: Sep. 7, 2004

(65) Prior Publication Data

US 2005/0029887 A1 Feb. 10, 2005

Related U.S. Application Data

(63) Continuation of application No. 09/722,952, filed on Nov. 27, 2000, now abandoned.

(51) Int. Cl.[7] .................. H02K 49/10; H02K 49/00; H02K 41/00; H02K 7/06; H02K 37/00
(52) U.S. Cl. .............. 310/46; 310/156.53; 310/156.47; 310/156.32; 310/154.16; 310/103
(58) Field of Search ......................... 310/12, 46, 103, 310/154, 156

(56) References Cited

U.S. PATENT DOCUMENTS

| | | | | |
|---|---|---|---|---|
| 1,724,446 A | * | 8/1929 | Worthington | 310/46 |
| 3,935,487 A | | 1/1976 | Czerniak | 310/46 |
| 3,967,146 A | | 6/1976 | Howard | 310/80 |
| 3,992,132 A | | 11/1976 | Putt | 417/271 |
| RE29,165 E | | 3/1977 | Bode | 310/46 |
| 4,011,477 A | | 3/1977 | Scholin | 310/80 |
| 4,025,807 A | | 5/1977 | Clover et al. | 310/46 |
| 4,074,153 A | * | 2/1978 | Baker et al. | 310/12 |
| 4,132,911 A | | 1/1979 | Garron | 310/46 |
| 4,151,431 A | | 4/1979 | Johnson | 310/12 |
| 4,179,633 A | | 12/1979 | Kelly | 310/80 |
| 4,196,365 A | | 4/1980 | Presley | 310/23 |
| 4,207,773 A | | 6/1980 | Stahovic | 74/25 |
| 4,215,330 A | | 7/1980 | Hartman | 335/306 |
| 4,300,067 A | | 11/1981 | Schumann | 310/80 |

(List continued on next page.)

FOREIGN PATENT DOCUMENTS

| | | |
|---|---|---|
| DE | 3315573 A1 | 10/1984 |
| DE | 3526806 A | 5/1986 |
| FR | 2542144 A1 | 12/1982 |
| FR | 2720878 A3 | 2/1994 |
| GB | 2282009 A | 3/1995 |

*Primary Examiner*—Darren Schuberg
*Assistant Examiner*—Pedro J. Cuevas
(74) *Attorney, Agent, or Firm*—Akin Gump Strauss Hauer & Feld, LLP

(57) ABSTRACT

A motor providing unidirectional rotational motive power is provided. The motor has a generally circular stator with a stator axis, an outer surface, and a circumferential line of demarcation at about a midpoint of the outer surface. The motor also includes one or more stator magnets attached to the outer surface of the stator. The stator magnets are arranged in a generally circular arrangement about the stator axis and generate a first magnetic field. An armature is attached to the stator for rotation therewith, the armature having an axis parallel to the stator axis. One or more rotors, are spaced from the armature and coupled thereto by an axle for rotation about an axis of each rotor, each rotor rotating in a plane generally aligned with the armature axis. Each rotor includes one or more rotor magnets, with each rotor magnet generating a second magnetic field. The second magnetic field generated by each rotor magnet interacts with the first magnetic field to cause each rotor to rotate about the rotor axis. A linkage assembly drivingly connects each rotor to the stator to cause the armature to rotate about the armature axis thereby providing the unidirectional rotational motive power of the motor.

19 Claims, 14 Drawing Sheets

U.S. PATENT DOCUMENTS

| | | | | |
|---|---|---|---|---|
| 4,357,551 A | | 11/1982 | Dulondel | 310/46 |
| 4,422,530 A | | 12/1983 | Denton | 185/29 |
| 4,438,362 A | | 3/1984 | Brown | 310/152 |
| 4,517,477 A | | 5/1985 | Pankratz | 310/23 |
| 4,575,652 A | | 3/1986 | Gogue | 310/49 R |
| 4,598,221 A | | 7/1986 | Lawson et al. | 310/103 |
| 4,763,358 A | | 8/1988 | Danley | 381/165 |
| 4,811,375 A | | 3/1989 | Klostermann | 378/131 |
| 4,831,296 A | * | 5/1989 | Nagaba | 310/86 |
| 4,877,983 A | * | 10/1989 | Johnson | 310/12 |
| 4,882,509 A | | 11/1989 | Wottlin | 310/46 |
| 4,939,398 A | | 7/1990 | Lloyd | 310/156.53 |
| 4,960,474 A | * | 10/1990 | Nozawa et al. | 148/302 |
| 5,258,678 A | * | 11/1993 | Futami | 310/156.53 |
| 5,313,127 A | | 5/1994 | Danley et al. | 310/36 |
| 5,315,191 A | * | 5/1994 | Suzuki | 310/40 MM |
| 5,402,021 A | * | 3/1995 | Johnson | 310/12 |
| 5,455,474 A | | 10/1995 | Flynn | 310/181 |
| 5,576,588 A | | 11/1996 | Moribayashi et al. | 310/154.16 |
| 5,578,884 A | | 11/1996 | Moribayashi et al. | 310/154.16 |
| 5,598,739 A | | 2/1997 | Blake et al. | 74/89 |
| 5,710,426 A | | 1/1998 | Reed | 250/237 G |
| 5,925,958 A | | 7/1999 | Pirc | 310/152 |
| 5,945,760 A | | 8/1999 | Honda et al. | 310/156.53 |
| 6,084,322 A | | 7/2000 | Rounds | 310/46 |
| 6,177,745 B1 | * | 1/2001 | Narita et al. | 310/156.53 |
| 6,184,605 B1 | * | 2/2001 | Kim | 310/156.26 |
| 6,396,183 B1 | * | 5/2002 | Tajima et al. | 310/156.53 |
| 6,433,452 B1 | * | 8/2002 | Graham | 310/152 |
| 6,462,452 B2 | * | 10/2002 | Nakano et al. | 310/156.47 |

* cited by examiner

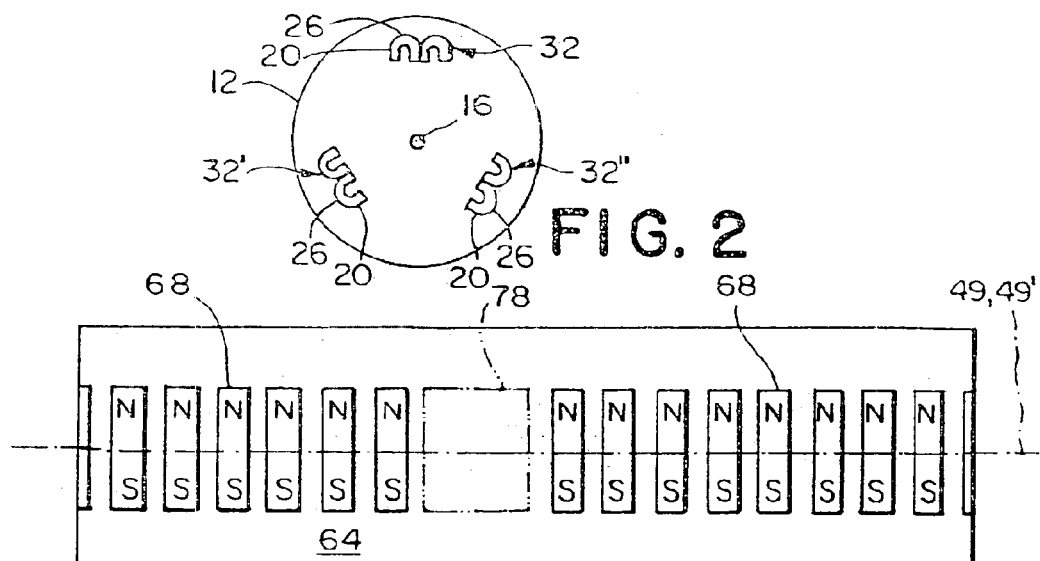
FIG. 2
FIG. 3
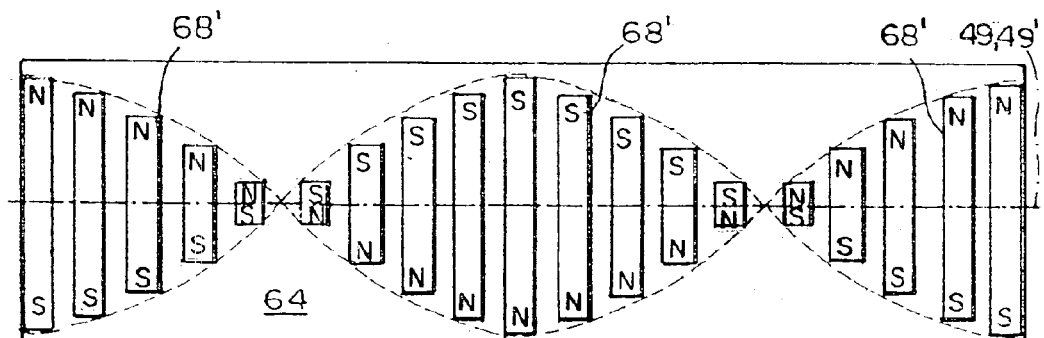
FIG. 4
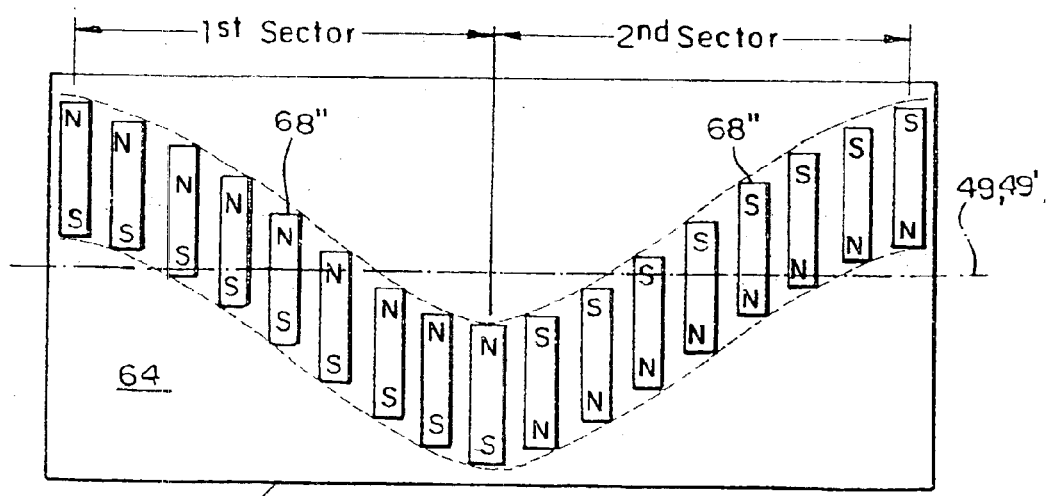
FIG. 5

DIRECTION OF TRANSLATION

DIRECTION OF TRANSLATION

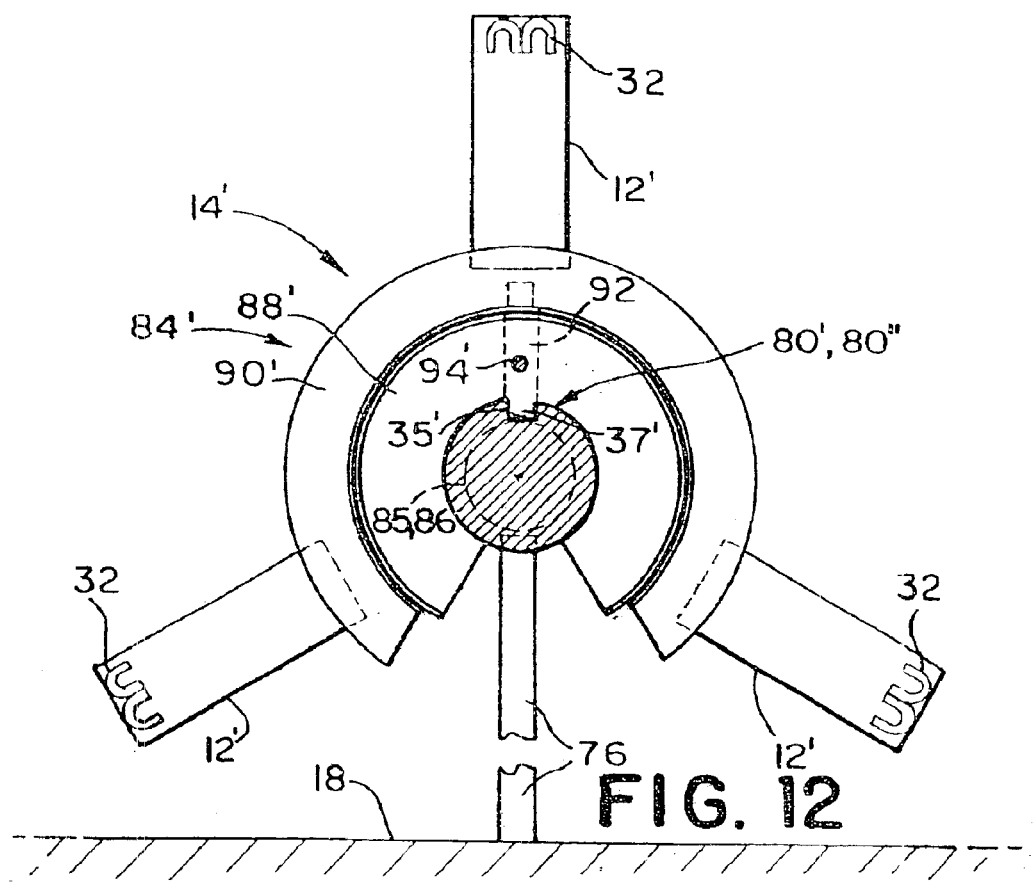

PERMANENT MAGNET MOTOR

CROSS-REFERENCE TO RELATED APPLICATIONS

This application is a continuation of U.S. patent application Ser. No. 09/722,952, filed Nov. 27, 2000 now abandoned. The prior application is hereby incorporated in its entirety.

BACKGROUND OF THE INVENTION

This invention relates to dynamo electric motor structures and more particularly to rotary and linear permanent magnet motors.

Conventional electric motors rely on the interaction of magnetic fields to produce a force which results either rotary or linear motion. The magnetic fields in conventional electric motors providing rotary power are generated by passing an externally provided electric current through conductors in either a stator (i.e. stationary portion of the motor), a rotor (i.e. rotary portion) or both the stator and the rotor. The rotary power of the motor arises from a rotating magnetic field which is created by commutating the electric current, either by a switching the current through different conductors, as in a direct current motor or by a polarity reversal of the electric current as in an alternating current motor.

It is well known that a class of materials known as ferromagnetic materials are also capable of generating a magnetic field having once been energized. Ferromagnetic materials with high coercivity are known as permanent magnets. Permanent magnets are capable of storing a finite amount of energy and retaining the ability to generate a substantial magnetic field until the stored energy is depleted.

There are electric motors that use permanent magnets in either the stator portion of the motor or the rotor portion of the motor. These motors achieve a small size for the amount of power delivered by the motor because the motors avoid having current carrying conductors to produce the magnetic field which is otherwise produced by the permanent magnets. However, these conventional permanent magnet motors still require a source of external power to produce a rotating magnetic field.

There have also been developed permanent magnet motors which use permanent magnets for both the stator and the rotor. For example, U.S. Pat. No. 4,598,221 discloses a permanent magnet motor which relies on an external source of power to rotate the magnetic fields of a rotor by ninety degrees with respect to the interacting stator magnetic fields to eliminate the counterproductive magnetic repulsion and attraction between the rotor and the stator magnets. In another example, U.S. Pat. No. 4,882,509 discloses a permanent magnet motor which relies on an external source of power to position a shield which does not permit coupling between the rotor and the stator magnets at times when attraction or repulsion would drag down the strength of the motor.

There are many instances where a motor action is required and no source of external power is available. Accordingly, a motor which relies solely on the energy stored in permanent magnets would be useful.

BRIEF SUMMARY OF THE INVENTION

Briefly stated, the present invention comprises a rotor for use in a permanent magnet motor and for providing motive power by rotation of the rotor about a rotor axis. The rotor comprises at least one first U-shaped magnet having a rear side and generating a first magnetic field. The rotation of the rotor about the rotor axis is caused by an interaction of a portion of the first magnetic field directly adjacent to the rear of the at least one U-shaped magnet with a stationary second magnetic field.

Another aspect of the present invention comprises a rotor providing motive power by a rotation of the rotor about the rotor axis and by a translation of the rotor in a direction of the rotor axis. The rotor comprises: a first U-shaped magnet having a north pole, a south pole and a rear side, the first U-shaped magnet generating a first magnetic field; a second U-shaped magnet having a north pole and a south pole, the south pole of the second U-shaped magnet abutting the north pole of the first U-shaped magnet; and a third U-shaped magnet having a north pole and a south pole, the north pole of the third U-shaped magnet abutting the south pole of the first U-shaped magnet. A portion of the first magnetic field generated by the first U-shaped magnet directly adjacent to the rear of the first U-shaped magnet interacts with a stationary fourth magnetic field to cause the rotor to rotate. A second magnetic field generated by the north pole of the second U-shaped magnet and a third magnetic field generated by the south pole of the third U-shaped magnet interact with the fourth magnetic field to cause the rotor to translate in the direction of the rotor axis.

A further aspect of the present invention comprises a rotor including a rotor axis, and a thruster axis in a plane of the rotor and intersecting the rotor axis. The rotor provides motive power by a rotation of the rotor about the rotor axis and by a translation of the rotor in a direction of the rotor axis. The rotor comprises: a first U-shaped magnet having a north pole and a south pole and a rear side, the north pole and the south pole being generally aligned with the thruster axis, the first U-shaped magnet generating a first magnetic field; a first thruster magnet having a direction of magnetization generally aligned with the thruster magnet axis, the first thruster magnet being proximate to and spaced from the north pole of the first U-shaped magnet; and a second thruster magnet having a direction of magnetization generally aligned with the thruster magnet axis, the second thruster magnet being proximate to and spaced from the south pole of the first U-shaped magnet, the first U-shaped magnet being interposed between the first and the second thruster magnets. A portion of the first magnetic field generated by the first U-shaped magnet directly adjacent to the rear side of the first U-shaped magnet interacts with a stationary fourth magnetic field to cause the rotor to rotate, a second magnetic field generated by the first thruster magnet and a third magnetic field generated by the second thruster magnet respectively interact with a stationary fifth magnetic field to cause the rotor to translate in the direction of the rotor axis.

Another aspect of the present invention comprises a rotor providing motive power by rotation of the rotor about a rotor axis and translation of the rotor in the direction of the rotor axis. The rotor has at least one rotor magnet generating a first magnetic field, the first magnetic field being generated by the at least one rotor magnet interacting with at least one stationary U-shaped magnet, the at least one U-shaped magnet having a rear side and generating a second magnetic field. The rotational and translational motive power of the rotor is provided by an interaction of a portion of the second magnetic field directly adjacent to the rear of the at least one U-shaped magnet with the first magnetic field.

A further aspect of the present invention comprises a motor providing unidirectional rotational motive power. The motor includes a generally circular stator having a stator axis, an outer surface, and a circumferential line of demarcation at about a midpoint of the outer surface; at least one stator magnet attached to the outer surface of the stator, the at least one stator magnet being arranged in a generally circular arrangement about the stator axis and generating a first magnetic field; an armature attached to the stator for rotation therewith, the armature having an axis parallel to the stator axis; at least one rotor, the at least one rotor being spaced from the armature and coupled thereto by an axle for rotation about an axis of the at least one rotor, the at least one rotor rotating in a plane generally aligned with the armature axis, the at least one rotor including at least one rotor magnet generating a second magnetic field, wherein the second magnetic field generated by the at least one rotor magnet interacts with the first magnetic field to cause the at least one rotor to rotate about the rotor axis; and a linkage assembly drivingly connecting the at least one rotor to the stator to cause the armature to rotate about the armature axis as the at least one rotor rotates about the rotor axis thereby providing the unidirectional rotational motive power of the motor.

In another aspect, the present invention is directed to a motor providing unidirectional rotational motive power comprising: a generally circular stator having an axis, an outer surface, and a circumferential line of demarcation around the outer surface, the line of demarcation having a pre-determined direction around the stator axis and separating a first side of the outer surface and a second side of the outer surface, wherein at least one pair of stator magnets is attached to the outer surface generating a first magnetic field, the at least one pair of magnets comprising a first stator magnet having a north pole and a south pole and a second stator magnet having a north pole and a south pole, the south pole of the first stator magnet being located on the first side of the outer surface and the north pole of the first stator magnet being closest to the line of demarcation, the north pole of the second stator magnet being located on the second side of the outer surface and the south pole of the second stator magnet being closest to the line of demarcation, wherein the at least one pair of stator magnets is spaced along the line of demarcation such that a first intermagnet distance measured along the line of demarcation between the north pole of the first stator magnet and the south pole of the second stator magnet of an adjacent pair of the at least one pair of stator magnets is generally equal to a second intermagnet distance measured along the line of demarcation between the south pole of the first stator magnet and the north pole of the second stator magnet; an armature attached to the stator, the armature having an axis parallel to the stator axis and attached to the stator for rotation therewith; and at least one rotor attached to the armature, the at least one rotor being spaced from the armature and coupled thereto by an axle for rotation about an axis of the at least one rotor, the at least one rotor rotating in a plane generally aligned with the armature axis, the at least one rotor comprising at least one rotor magnet, the at least one rotor magnet generating a second magnetic field which interacts with the at least one first magnetic field to cause the at least one rotor to rotationally oscillate about the axis of the at least one rotor and to generate a force in a direction of the rotor axis, thereby causing the armature to rotate in the pre-determined direction around the armature axis to provide the unidirectional rotational motive power of the motor.

In a further aspect, the present invention is directed to a motor providing unidirectional linear motive power comprising: a linear stator having a generally arcuate cross-section and a longitudinal line of demarcation perpendicular to the cross-section extending on about a midpoint of a surface of the stator between a first end and a second end of the stator, the stator including at least one magnet arranged between the first end and the second end, the at least one magnet having a direction of magnetization at about a right angle to the line of demarcation and generating a first magnetic field, the magnitude of the first magnetic field being generally uniform along the line of demarcation except in a pre-determined number of null regions, wherein the first magnetic field is substantially zero a rail connected to the stator, the rail having a longitudinal axis generally parallel to the line of demarcation and a helical groove with a pre-determined pitch running around a periphery of the rail; at least one rotor having a rotor axis aligned with the axis of the rail, the at least one rotor being connected to the rail such that the at least one rotor is free to rotate about the axis of the rail and slide along the rail, the at least one rotor including at least one U-shaped magnet having a rear side and generating a second magnetic field, wherein a portion of the second magnetic field directly adjacent to the rear of the at least one U-shaped magnet interacts with the at least one first magnetic field to cause the at least one rotor to rotate about the axis of the rail; a bearing assembly connecting the at least one rotor to the helical groove, the bearing assembly converting the rotary motion of the at least one rotor about the axis of the rail to linear motion along the rail; and a cross-link connecting the bearing assembly of a first at least one rotor to a second at least one rotor, thereby adding together the linear motion along the rail of the first at least one rotor and the second at least one rotor to provide the unidirectional linear motive power.

In yet another aspect, the present invention is directed to a motor providing unidirectional motive power comprising: a rail having a longitudinal axis and at least one helical groove having a pre-determined pitch running around a periphery of the rail; at least one first helical stator concentrically surrounding the rail, the at least one first helical stator having the pre-determined pitch of the groove and a longitudinal axis generally parallel to the axis of the rail, at least one first stator magnet being attached to the at least one first helical stator, the at least one first stator magnet generating a first magnetic field; at least one rotor having an axis generally aligned with the axis of the rail, the at least one rotor being connected to the rail such that the at least one rotor is free to rotate about the axis of the rail and slide along the rail, the at least one rotor comprising at least one rotor magnet generating a second magnetic field, the second magnetic field interacting with the first magnetic field generated by the at least one first stator magnet to cause the at least one rotor to rotate about the axis of the rail; and a bearing assembly connecting the at least one rotor to the helical groove around the periphery of the rail, the bearing assembly converting the rotational motion of the at least one rotor about the rail to unidirectional linear motion along the rail.

A further aspect of the present invention is directed to a motor providing unidirectional motive force comprising: a rail having a longitudinal axis and a helical groove running around the rail, the groove having a pre-determined pitch; at least one first helical stator comprising a plurality of discontinuous spaced apart first ribs, each first rib partially surrounding the rail at a generally uniform distance from the rail, the first helical stator having the pre-determined pitch of the groove and a longitudinal axis generally aligned with the rail, at least one first stator magnet being attached to each rib, each first stator magnet generating a first magnetic field, at least one rotor having an axis generally aligned with the axis of the rail, the at least one rotor being connected to the rail such that the at least one rotor is free to rotate about the axis of the rail and to slide along the rail, the at least one rotor comprising at least one rotor magnet generating a second magnetic field, the second magnetic field interacting with the first magnetic field generated by the at least one first stator magnet to cause the at least one rotor to rotate about the axis of the rail; and a bearing assembly connecting the at least one rotor to the helical groove around the rail, the bearing assembly converting the rotary motion of the at least one rotor about the rail to linear motion along the rail.

The present invention is further directed to a motor providing unidirectional motive power comprising: a rail having a longitudinal axis and a generally sinusoidal groove running around a periphery of the rail, the sinusoidal groove having a pre-determined period; at least one stator having a generally arcuate cross-section and a longitudinal line of demarcation perpendicular to the cross-section located at about a midpoint of a surface of the at least one stator, the surface of the at least one stator being disposed generally equidistant from and parallel to the axis of the rail; at least one stator magnet attached to the surface of the at least one stator generating a first magnetic field, the at least one stator magnet having a magnetization which is displaced sinusoidally from the line of demarcation, the sinusoid having a pre-determined period and a pre-determined maximum amplitude and being divided into a plurality of alternating first and second sectors, with a boundary between the alternating first and second sectors occurring at the maximum amplitude of the sinusoid, the direction of magnetization of the at least one stator magnet being opposite in direction in the first and second segments; at least one rotor having an axis aligned with the axis of the rail, the at least one rotor being connected to the rail such that the at least one rotor is free to rotate about the axis of the rail and slide along the rail, the at least one rotor including at least one U-shaped magnet having a rear side and generating a second magnetic field, the at least one U-shaped magnet being positioned on the at least one rotor such that the rear side of the at least one U-shaped magnet is apposite to the first and the second segments of the stator as the at least one rotor rotates about the rotor axis, wherein an interaction of a portion of the second magnetic field directly adjacent to the rear of the at least one U-shaped magnet with the first magnetic field causes the at least one rotor to rotationally oscillate about the axis of the rail; and a bearing assembly connecting the at least one rotor to the sinusoidal groove around the rail, the bearing assembly converting the oscillatory motion of the at least one rotor about the rail to unidirectional linear motion along the rail.

The present invention is also directed to a motor providing unidirectional motive power comprising: a rail having a longitudinal axis and a helical groove running around a periphery of the rail, the helical groove having a pre-determined pitch; at least one stator having a generally having a longitudinal line of demarcation located at about a midpoint of a surface of the at least one stator, the surface of the at least one stator being disposed generally equidistant from and parallel to the axis of the rail; at least one stator magnet attached to the surface of the at least one stator, the at least one stator magnet having a direction of magnetization which rotates about a magnetic axis parallel to the line of demarcation with a pre-determined pitch, thereby generating a first magnetic field having a substantially uniform magnitude along the magnetic axis and rotates around the magnetic axis with the pre-determined pitch of the at least one stator magnet rotation; at least one rotor having an axis aligned with the axis of the rail, the at least one rotor being connected to the rail such that the at least one rotor is free to rotate about the axis of the rail and slide along the rail, the at least one rotor including at least one U-shaped magnet generating a second magnetic field, the at least one U-shaped magnet being positioned on the at least one rotor such that a portion of the second magnetic field directly adjacent to the rear side of the at least one U-shaped magnet interacts with the first magnetic field of the at least one stator magnet to cause the at least one rotor to rotate about the rotor axis; and a bearing assembly connecting the at least one rotor to the helical groove, the bearing assembly converting the rotary motion of the at least one rotor about the rail to unidirectional linear motion along the rail.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a schematic plan view of a rotor comprising three pair of U-shaped magnets;

FIG. 3 is a schematic plan view of stator having a plurality of stator magnets generating a uniform magnetic field except in single null region, laid out flat for ease of illustration;

FIG. 4 is an schematic plan view of a stator having a plurality of stator magnets which rotate about a magnetic axis, laid out flat for ease of illustration;

FIG. 5 is an schematic plan view of a stator having a plurality of stator magnets which are sinusoidally displaced from a line of demarcation, laid out flat for ease of illustration;

FIG. 12 is an end elevational view of the rotor assembly shown in FIG. 11B, further including a rail mounting post;

DETAILED DESCRIPTION OF THE INVENTION

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims. It should also be understood that the articles "a" and "the" used in the claims to define an element may refer to a single element or to a plurality of elements without a limit as to the number of elements.

Past attempts to construct a working permanent magnet motor have met with difficulties because of the simultaneous attractive and repulsive characteristics of a permanent magnet. A principle has been discovered where, by engaging a magnetic field at the rear of one or more U-shaped magnets mounted on a rotor with a second stationary magnetic field, a torque is created that rotates the rotor about a rotational axis of the rotor. Further, by properly shaping the second magnetic field, the rotor may be caused to also translate in the direction of the rotor axis.

Figure 7A:
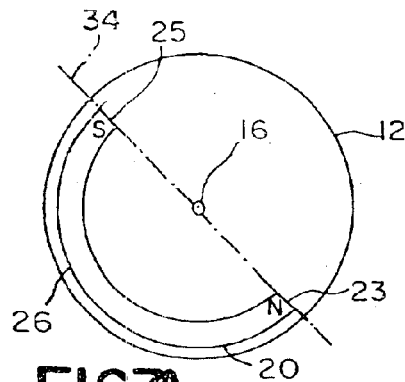
FIG. 7A is a schematic plan view of a rotor used in the fourth preferred embodiment and in an eighth preferred embodiment of the motor.

Accordingly, using the aforementioned principle, and referring to FIG. 7A, one aspect of the present invention is directed to a rotor 12 for use in a motor and which provides motive power by a rotation of the rotor 12 about a rotor axis 16 and by a translation of the rotor 12 in a direction of the rotor axis 16. In one aspect, the rotor 12 comprises a first U-shaped magnet 20 in which the U-shaped magnet 20 generates a first magnetic field. A rotation of the rotor 12 about the rotor axis 16 is caused by an interaction of a portion of the first magnetic field directly adjacent to a rear 26 of the U-shaped magnet 20 with a stationary second magnetic field. A translation of the rotor 12 in the direction of the rotor axis 16 is caused by an interaction of the first magnetic field adjacent to a north pole 23 and a south pole 25 of the U-shaped magnet 20 with the stationary second magnetic field. As will be appreciated by those skilled in the art, the design of the rotor 12 is not limited to a single U-shaped magnet 12. A plurality of U-shaped magnets 20, arranged around a periphery of the rotor 12 is within the spirit and scope of the invention.

Figure 7B:
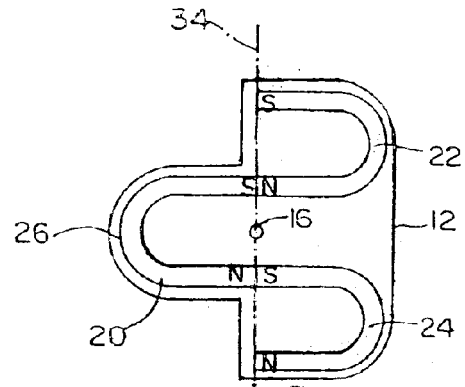
FIG. 7B is a schematic plan view of a rotor used in a fifth preferred embodiment and in a ninth preferred embodiment of the motor.

Another aspect of the present invention, shown in FIG. 7B comprises a rotor 12 including a first U-shaped magnet having a north pole and a south pole generating a first magnetic field; a second U-shaped magnet 24 having a north pole and a south pole with the south pole of the second U-shaped magnet 24 abutting the north pole of the first U-shaped magnet 20; and a third U-shaped magnet 22 having a north pole and a south pole with the north pole of the third U-shaped magnet 22 abutting the south pole of the first U-shaped magnet 20. A portion of the first magnetic field generated by the first U-shaped magnet 20 directly adjacent to the rear 26 of the first U-shaped magnet 20 interacts with a stationary fourth magnetic field to cause the rotor 12 to rotate. A second magnetic field generated by the north pole of the second U-shaped magnet 24 and a third magnetic field generated by the south pole of the third U-shaped magnet 22 respectively interact with the fourth magnetic field to cause the rotor 12 to translate in the direction of the rotor axis 16.

Figure 7C:
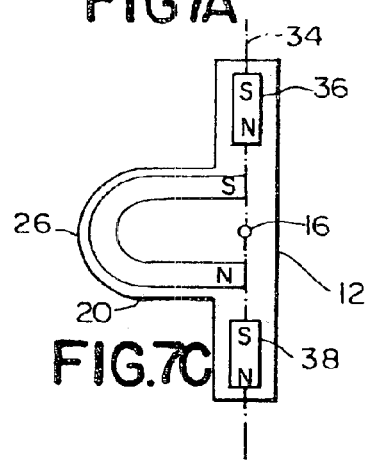
FIG. 7C is a schematic plan view of a rotor used in a sixth preferred embodiment and in a tenth preferred embodiment of the motor.
Figure 7D:
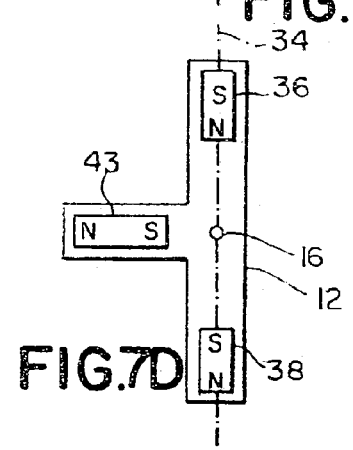
FIG. 7D is a schematic plan view of a rotor used in the seventh preferred embodiment and in an eleventh preferred embodiment of the motor.

A further aspect of the present invention, shown in FIG. 7C, comprises a first U-shaped magnet 20 having a north pole and a south pole generating a first magnetic field. The north pole and the south pole of the U-shaped magnet 20 are generally aligned with a thruster axis 34 which lies in the plane of the rotor 12 and intersects the rotor axis 16. A first thruster magnet 36 is located proximate to and spaced from the north pole of the first U-shaped magnet with a direction of magnetization being generally aligned with the thruster magnet axis 34. A second thruster magnet 38 is located proximate to and spaced from the south pole of the first U-shaped magnet 20 with a direction of magnetization also being generally aligned with the thruster magnet axis 34. A portion of the first magnetic field generated by the first U-shaped magnet 20 directly adjacent to the rear side 26 of the first U-shaped magnet 20 interacts with a stationary fourth magnetic field to cause the rotor 12 to rotate. A second magnetic field generated by both the north pole and the south pole of the first thruster magnet 36 and a third magnetic field generated by both the north pole and the south pole of the second thruster magnet 38 respectively interact with a fifth magnetic field to cause the rotor 12 to translate in the direction of the rotor axis 16. In one further aspect of the rotor 12, as shown in FIG. 7D, a bar magnet 43 may be substituted for the U-shaped magnet 20 and the fourth magnetic field is formed by one or more U-shaped magnets, where the bar magnet 43 interacts with a portion of the stationary fourth magnetic field adjacent to the rear of a U-shaped magnet.

As will be appreciated by those skilled in the art, the polarities of the magnets shown in FIGS. 7A, 7B, 7C and 7D may be reversed and still be within the spirit and scope of the invention.

Figure 1A:
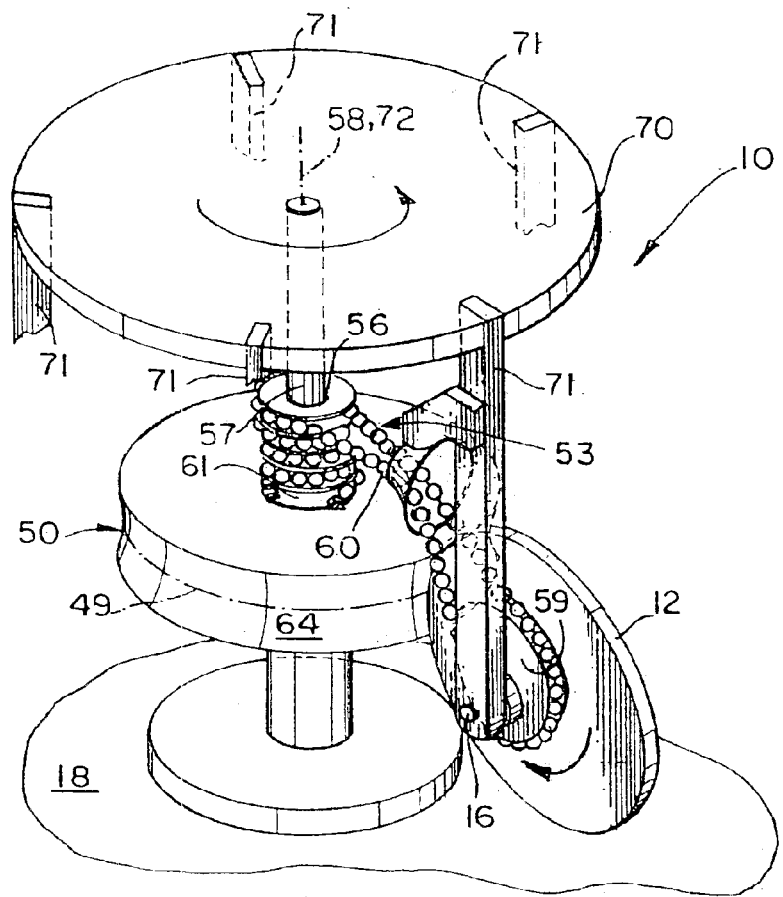
FIG. 1A is a schematic perspective drawing of a first preferred embodiment of a motor providing unidirectional motive power.

Referring now to FIGS. 1A, 2 and 3 there is shown a first preferred embodiment of a motor 10 using the rotor 12 and providing unidirectional rotational motive power. The first preferred embodiment comprises a generally circular stator 50 having a stator axis 72 and a circumferential surface 64 mounted to a base 18; an armature 70, having an armature axis of rotation 58 coincident with the stator axis 72, attached to the stator 50 by an armature axle 57 for rotation about the armature axis of rotation 58; and five rotors 12 (only one of which is shown for clarity), the rotors 12 being spaced at intervals of about 72 degrees around the armature 70. Each rotor 12 is spaced from the armature by an armature strut 71 and attached to the armature strut 71 by an axle, for rotation about an axis 16 of the rotor 12 in a plane generally aligned with the armature axis of rotation 58. The motor 10 further includes a linkage assembly 53 drivingly connecting each rotor 12 and the stator 50 together, the linkage 53 urging the armature 70 to rotate about the armature axis of rotation 58 as each rotor 12 rotates about its respective rotor axis 16. As will be appreciated by those skilled in the art the number of rotors 12 is not limited to the five rotors 12 disclosed in the first embodiment. Any number of rotors 12 from one to as many as there would be space for mounting on the armature 70 is within the spirit and scope of the invention.

Preferably, the surface 64 of the stator 50 is arcuate, having a curvature conforming to the arc of the rotors 12. However, it will be appreciated by those skilled in the art that the surface 64 need not be arcuate but could be planar and still be within the spirit and scope of the invention. As will be appreciated by those skilled in the art the stator 50 is merely intended as a stationary supporting stricture for stator magnets and, as such, the shape of the stator 50 is not intended to be controlling of the size and shape of the air gap between the magnets attached to the stator 50 and the magnets attached to the rotors 12.

Preferably, the stator 50 is made of a material (or a combination of materials) having a magnetic susceptibility less than 10-3, i.e. a material displaying paramagnetic or diamagnetic properties. For example, the stator 50 could be made of a non-magnetic metal such as aluminum or brass. Also, the rotor 12 could be made of a natural material such as wood, glass, a polymeric material or a combination of any of the aforementioned materials within the spirit and scope of the invention. Further, it should be understood that the aforementioned materials are preferred for the stators and all other parts of the motor 10 that could significantly disrupt the magnetic interaction between the stator and the rotor of all of the disclosed preferred embodiments of the motor 10.

In the first preferred embodiment, the surface 64 of the stator 50 includes a circumferential line of demarcation 49 at about a midpoint of the surface 64 formed by an intersection with the surface 64 of a plane perpendicular to the armature axis of rotation 58. As shown in FIG. 3, the stator 50 includes a plurality of bar magnets 68 attached to the outer surface 64 along the line of demarcation 49, except in a single null region 78 where the magnitude of the first magnetic field is substantially reduced. The bar magnets 68 have a direction of magnetization at about a right angle to the line of demarcation 49 thereby creating a first magnetic field adjacent to the outer surface 64, the magnitude and the direction of which is substantially uniform along the circumferential line of demarcation 49 around the axis 58 of the stator 50, except within the null region 78. As will be appreciated by those skilled in the art, the stator axis 72 need not be coincident with the armature axis of rotation 58. Accordingly, a stator 50 arranged around the armature axis 58 at any location at which the stator axis 72 is parallel to the armature axis 58 and the surface 64 of the stator 50 faces the periphery of the rotors 12 thereby providing for the interaction between the first magnetic field and the second magnetic field around the armature axis 58, is within the spirit and scope of the invention.

Preferably, as further shown in FIG. 3, the bar magnets are attached to the surface 64 of the stator 50 such that the direction of magnetization of the bar magnets 68 are about perpendicular to a radial lie of the rotor 12. However, the bar magnets 68 could also be attached to the surface 64 of the stator such that the direction of magnetization of the bar magnets 68 is aligned with a radial line of the rotor 12. The bar magnets 68 are preferably abutting so as to form the substantially uniform first magnetic field. However, it is not necessary for the bar magnets 68 to abut one another. Further, it is not necessary to use a plurality of bar magnets 68 to form the first magnetic field. A single magnet producing a uniform first magnetic field in the region in which the first magnetic field interacts with the second magnetic field of the rotors 12 would provide the required first magnetic field. Also, the number of null regions 78 may be more than one, depending upon the desired speed of the motor, as explained below.

Preferably, the stator magnets 68 are permanent magnets made of a neodymium-iron-boron material. However, as will be appreciated by those skilled in the-art, any type of permanent magnet material displaying ferromagnetic properties could be used for the stator magnets 68. For instance, stator magnets 68 made of samarium cobalt, barium ferrite or Alnico are within the spirit and scope of the invention. It should be understood that the aforementioned permanent magnet materials or their equivalents are preferred for the stator magnets and the rotor magnets of all of the disclosed preferred embodiments of the motor 10. Also, while the use of permanent magnets is preferred, the use of electromagnets for some or all of the magnets is within the spirit and scope of the invention.

As discussed above, the stator 50 may include a predetermined number of null regions 78 on the surface of the stator 64. In the first preferred embodiment, the single null region 78 is formed by a shield of a ferromagnetic material, such as iron, placed adjacent to the surface 64. However, as those skilled in the art will appreciate, the null region 78 can also be formed by an absence of the bar magnets 68 in the region coinciding with the null region 78. The null region 78 of substantially reduced magnetic field magnitude may also be formed by an auxiliary magnetic field suitably generated by one or more permanent magnets or by one or more electromagnets powered by an electric current arranged so that the auxiliary magnetic field substantially cancels the first magnetic field in the null region 78. In the case of the electromagnets, the electric current may be turned off in synchronism with the rotation of the rotors 12 passing through the null region 78, in order to conserve power. Preferably, the first magnetic field is reduced to ten percent or less of the magnetic force outside of the null region. However, the motor 10 will operate with a reduction of only fifty percent. Accordingly, a motor 10 having a substantial reduction of the first magnetic field of fifty percent or less is within the spirit and scope of the invention.

As shown in FIG. 2, the rotor 12 of the first preferred embodiment includes three pairs 32, 32', 32" of abutted U-shaped magnets 20 spaced apart at about 120 degree intervals around the periphery of the rotor 12. Preferably, the U-shaped magnets 20 having substantially identical magnetic properties and are arranged to have opposite poles of the abutting each other. The pairs 32, 32', 32" of abutted U-shaped magnets 20 are positioned such that the north pole nd the south poles of each U-shaped magnet 20 face toward the axis of the rotor 16, and the rear side 26 of each U-shaped magnet 20, opposite to the north and the south pole of the U-shaped magnet 20, faces out from the axis of the rotor 16 toward the surface 64 of the stator 50. The pairs 32, 32', 32" of the U-shaped magnets 20 are situated on the rotor 12 such that a portion of the second magnetic field directly adjacent to the rear 26 of each U-shaped magnet 20 interacts with a first stationary magnetic field to cause the rotor 12 to rotate about its respective rotor axis 16. Those skilled in the art will appreciate that it is not necessary to have exactly three pairs 32, 32', 32" of U-shaped magnets 20 on the rotor 12. For instance, the number of U-shaped magnets 20 (or groups of abutted U-shaped magnets) spaced apart around the periphery of the rotor 12 may range from merely a single U-shaped magnet 20, up to a number of magnets limited only by the physical space around the periphery of the rotor 12. Further the number of abutted U-shaped magnets 20 within each group of magnets 32 is not limited to two magnets but may also range from 1 up to a number of magnets limited only by the physical space around the periphery of the rotor 12.

Preferably, the rotor 12 is made of a material (or a combination of materials) having a magnetic susceptibility less than 10-3. Accordingly, the rotor could be made of any of the same materials used to make the stator, such as for instance, a non-magnetic metal, wood, glass, a polymeric or a combination of any of the above as shown in FIG. 1A, the rotor 12 is preferably disk shaped with the rear 26 of the U-shaped rotor magnets 20 being arranged on the periphery of the rotor 12 such that the U-shaped magnets 20 pass in close proximity to the circumferential line of demarcation 49 on the outer surface 64 of the stator 50 as the rotor 12 rotates. However, as will be clear to those skilled in the art, the structure of the rotor 12 need not be disk shaped. The rotor 12 could be a structure of any shape capable of rotating around the rotor axis 16 and capable of supporting the U-shaped magnets 20 so that, as the rotor 12 rotates, the U-shaped magnets 20 come into close proximity with the outer surface 64 of the stator 50. For example a rotor 12 comprised of struts connected to a central bearing, where each strut holds one or more U-shaped magnets 20, is within the spirit and scope of the invention.

In the first preferred embodiment, the linkage 53 connecting each rotor 12 and the stator 50 comprises a beaded chain drive 60 which meshes with a stator sprocket 61 on the stator 50, and an eccentric rotor sprocket 59 on each rotor 12 such that, as each rotor 12 rotates about its respective rotor axis 16, the armature 70 is forced to rotate about the armature axis of rotation 58. The eccentric rotor sprocket 59 causes the instantaneous angular velocity of the rotor 12 about the rotor axis 16 to increase above the average angular velocity of the rotor 12 as each pair 32, 32', 32" of U-shaped magnets 20 passes through the null region 78. As will be appreciated by those skilled in the art, the rotor sprocket 59 could be circular and the stator sprocket 61 eccentric and still cause the angular velocity of the rotor 12 to increase. Further, the beaded chain 60 in combination with the stator sprocket 61 and the eccentric rotor sprocket 59 are not the only means for connecting each rotor 12 to the stator 50. For instance, the beaded chain 60 could also be a belt. Further, the linkage 53 could comprise a drive shaft between each rotor 12 and the stator 50, the drive shaft having a bevel gear set at each end of the shaft mating with a bevel gear on the rotor 12 and the stator 50. An automatic gear shift mechanism would shift gears as each U-shaped magnet pair 32, 32', 32" entered the null regions 78 to increase the instantaneous angular velocity of the rotor 12 as the pair 32, 32', 32" of rotor magnets 20 passed through the null region 78. Alternatively the linkage 53 could comprise a transmission system employing elliptical gears.

While it is preferred that the instantaneous angular velocity of the rotor 12 to increase above the average angular velocity of the rotor 12 as each pair of U-shaped magnets 20 passes through the null region 78, it is not necessary to provide the increased angular velocity of the rotor 12 to provide motive power from the motor 10.

Preferably, the diameters of the rotor sprocket 59 and stator sprocket 61 are selected such that the rear 26 of each U-shaped magnet 20 passes through one and only one null region 78 for each full revolution of the rotor 12 about the respective rotor axis 16 as the armature 70 rotates about the armature axis of rotation 58. Accordingly, the revolution rate of the armature 70 is related to the revolution rate of the rotor 12 by the expression:

$$S_a = (N_r/N_s) \times S_r \quad (1)$$

Where:

$S_a$ is the angular velocity of the armature 70 (RPM);

$N_r$ is the number of the U-shaped magnets 20 (or groups of abutted U-shaped magnets 32) on a rotor 12;

$N_s$ is the number of null regions 12 on the stator 50; and $S_r$ is the angular velocity of the rotor 12 (RPM).

The timing of the rotation of the rotor 12 around its respective rotor axis 16, and the armature 70 about the armature axis of rotation 58 is such that each U-shaped magnet 20 (or U-shaped magnet pair 32, 32', 32") on each rotor 12 enters into a null region 78 at a point where the magnetic interaction between the first magnetic field and the second magnetic field is substantially reduced, thus providing a commutation of the second magnetic field. As each rotor 12 continues to rotate about the rotor axis 12 and the armature 70 rotates about the armature axis of rotation 58, the U-shaped magnet 20 traces a slanted path through the null region 78. As the U-shaped magnet emerges from the null region 78, the U-shaped magnet 20 encounters the strong first magnetic field, which urges the U-shaped magnet 20 to continue the rotation of the rotor 12 about the rotor axis 16.

As previously discussed, the first preferred embodiment of the motor 10 comprises a single null region 78 and five rotors 12, each rotor 12 having three pairs 32, 32', 32" of abutted U-shaped magnets 20. Preferably, the rotors 12 are uniformly spaced around the armature axis of rotation 58 and the pairs 32, 32', 32" of U-shaped magnets 20 are uniformly spaced around the periphery of each respective rotor 12. Further, the pairs 32, 32', 32" of U-shaped magnets 20 on each rotor 12 are phased with respect to each other by one-fifth of a revolution of the rotor 12 (i.e. the reciprocal of the number of rotors) so that the pairs 32, 32', 32" of U-shaped magnets 20 of all the rotors 12 enter the null region at substantially uniform intervals to provide a more or less continuous magnetic interaction between the first magnetic field of the stator 50 and the second magnetic field of the rotors 12. As will be appreciated by those skilled in the art, the motive power provided by the motor is proportional to the number of rotors 12 and the number of magnets 20 on each rotor 12 as well as the strength of the rotor 12 magnets 20 and the stator 50 magnets 68. Accordingly, the number of rotors 12 and the number of pairs 32, 32', 32" of U-shaped magnets 20 are not limited to five rotors 12 and three pairs of U-shaped magnets 32. Similarly, the number of null regions 78 is not limited to one. The number of U-shaped magnets 20 and the number of null regions 78 are limited only by adherence to the rule established by equation 1.

Figure 1B:
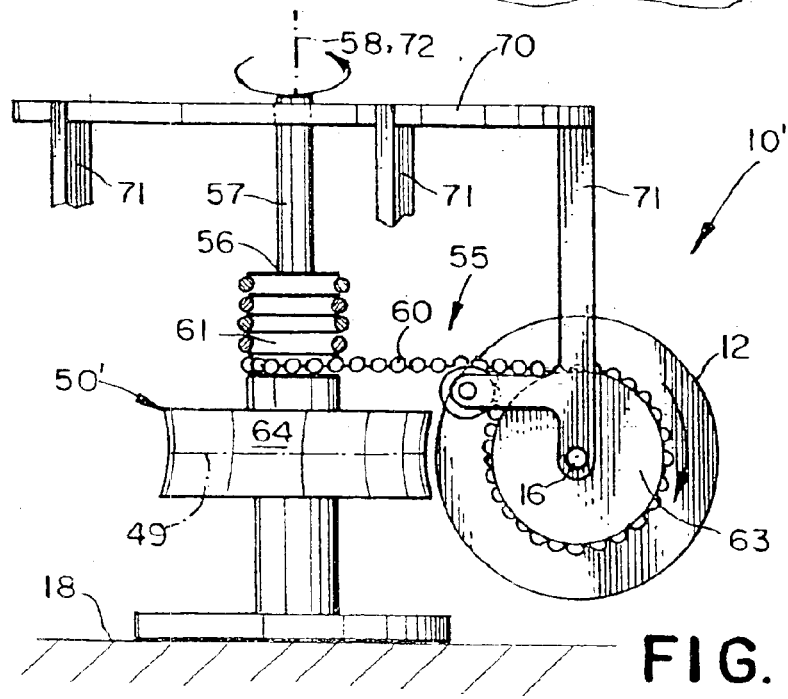
FIG. 1B is a schematic perspective drawing of a second preferred embodiment of the motor.

Referring now to FIGS. 1B, 2 and 4 there is shown a second preferred embodiment of a motor 10 providing unidirectional rotational motive power. The second preferred embodiment comprises a generally circular stator 50' having a stator axis 72 with magnets 68' affixed to a surface 64 of the stator 50'; an armature 70 attached to the stator 50' by an armature axle 57 for rotation about an armature axis of rotation 58 coincident with the stator axis 72; and five rotors 12 (only one of which is shown for clarity) having three pairs 32, 32', 32" of abutted U-shaped magnets 20, the rotors 12 being spaced at intervals of about 72 degrees around the armature 70. Each rotor 12 is spaced from the armature by a strut 71 and attached to the strut 71 by an axle for rotation in the plane of the armature axis of rotation 58 about a rotor 12 axis of rotation 16. The motor 10 further includes a linkage 55 drivingly connecting each rotor 12 and the stator 50 together to cause the armature 70 to rotate about the armature axis of rotation 58 as each rotor 12 rotates about its respective rotor axis 16.

The second preferred embodiment is identical to the first preferred embodiment except for two differences. First, instead of the first magnetic field being uniform in both magnitude and direction along the circumferential line of demarcation 49 (except in one or more null regions 78 as in the first preferred embodiment), the direction of the first magnetic field rotates about a magnetic axis parallel to the circumferential line of demarcation 49 with a pre-determined periodicity along the line of demarcation 49. Preferably, the first magnetic field is formed from one or more stator magnets 68' attached to the outer surface 64 of the stator 50', each magnet 68' having a direction of magnetization which causes the first magnetic field to rotate about the magnetic axis. In the second preferred embodiment, as shown in FIG. 4, the stator magnets 68' are equally sized bar magnets, attached to the stator 50' such that the bar magnets 68' spiral on the stator 50' with the pre-determined periodicity. However, as would be apparent to those skilled in the art, the first magnetic field need not be formed by bar magnets but could be formed from a single magnet (or groups of magnets) such that the direction of magnetization of the single magnet rotates around the magnetic axis.

The second difference between the first preferred embodiment and the second preferred embodiment is that the linkage 55 of the second preferred embodiment does not include a component for increasing the angular velocity of the rotor 12 above the average velocity of the rotor 12. Accordingly, in the second preferred embodiment, a circular rotor sprocket 63 is used in place of the eccentric rotor socket 59, thereby providing a constant rate of rotation of the rotor 12 about the rotor axis 16 as the armature 70 rotates about the stator 50'.

As would be clear to those skilled in the art, the rotation of the direction of the first magnetic field around the circumferential line of demarcation 49 commutates the second magnetic field, obviating the need for the null regions 78. In all other respects, the operation of the second embodiment is the same as that of the first embodiment. That is, the revolution rate of each rotor 12 is related to the revolution rate of the armature 70 by equation (1), where the parameter Ns is the number of rotations around the line of demarcation 49 of the first magnetic field along the line of demarcation 49. In the second preferred embodiment, as shown in FIG. 4, the number of rotations of the first magnetic field is one. Accordingly, since there are three pairs 32, 32', 32" of U-shaped magnets 20, each of the five rotors 12 makes one-third revolution for each full revolution of the armature 70 around the armature axis 58. However, as will be appreciated by those skilled in the art, the motor 10 could be designed for the first magnetic field to have any number of whole periods of rotation about the armature axis 58 provided that the revolution rate of the rotors 12 was adjusted to conform to equation (1).

Figure 1C:
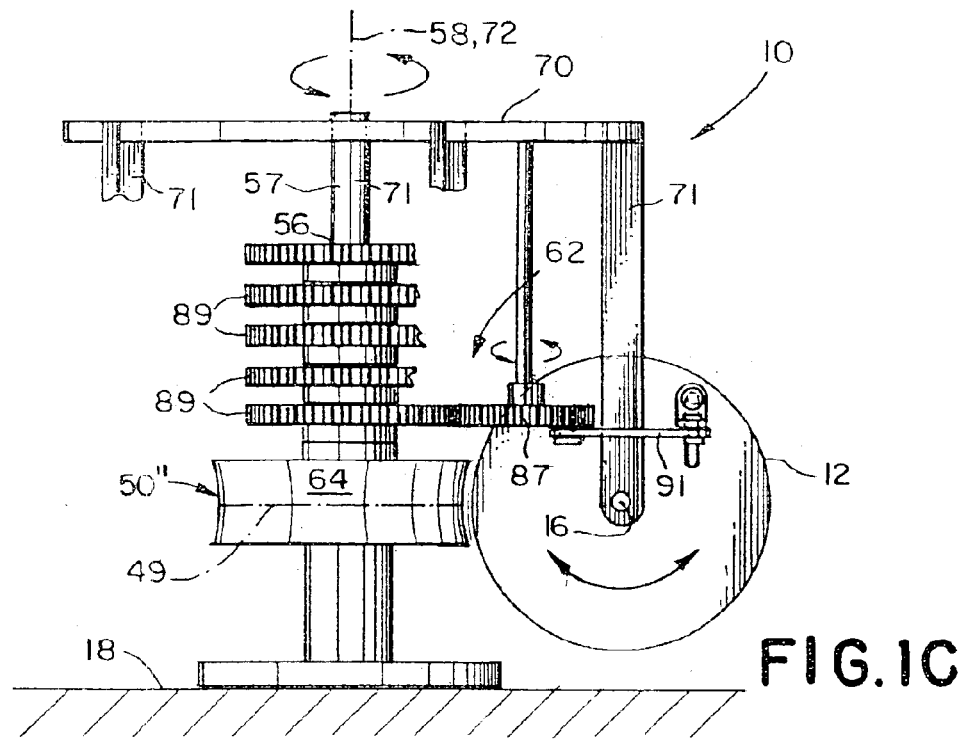
FIG. 1C is a schematic perspective drawing of a third preferred embodiment of the motor.

Referring now to FIGS. 1C, 2 and 5 there is shown a third preferred embodiment of a motor 10 providing unidirectional rotational motive power. The third preferred embodiment comprises a generally circular stator 50" mounted to a base 18 and having an axis 72, with magnets 68" affixed to the surface 64 of the stator 50", an armature 70 attached to the stator 50" by an axle 57 for rotation about an armature axis of rotation 58 coincident with the stator axis 12, and five rotors 12 (only one of which is shown for clarity) having three pairs 32, 32', 32" of abutted U-shaped magnets 20, the rotors 12 being spaced at intervals of about 72 degrees around the armature 70. Each rotor 12 is spaced from the armature by an armature strut 71 and attached to the armature strut 71 by an axle for rotation about an axis 16 of the rotor 12 in a plane generally aligned with the armature axis 58 about an axis 16 of the rotor 12. The motor 10 further includes a linkage 62 drivingly connecting each rotor 12 and the stator 50 together to cause the armature 70 to rotate about the armature axis of rotation 58 as each rotor 12 oscillates about its respective rotor axis 16.

The third preferred embodiment is identical to the first preferred embodiment except for three differences. First, instead of the first magnetic field being uniform in both magnitude and direction around the circumferential line of demarcation 49 (except in the null zone 78), the first magnetic field is displaced by a sinusoidal pattern having a pre-determined peak amplitude and a predetermined period along the circumferential line of demarcation 49, with the direction of the first magnetic field alternating in opposite directions along the line of demarcation 49 between each peak amplitude of the sinusoidal pattern.

Preferably, as shown in FIG. 5 the first magnetic field is formed by a plurality of bar magnets 68" arranged on the surface 64 of the stator 50" such that the magnetization of the bar magnets 68" is displaced in the sinusoidal pattern from the line of demarcation 49 around the circumferential line of demarcation 49. The sinusoidal pattern of the bar magnets 68" is divided into first and second sectors, the boundary of which occurs at the peaks of the sinusoidal pattern. The direction of magnetization of the bar magnets 68" is opposite in direction in the first and the second sectors providing a commutation of the second magnetic field and causing the rotors 12 to reverse in rotational direction as the rotor 12 oscillates around the rotor axis 16 and rotates around the armature axis of rotation 58.

Preferably, the sinusoidal pattern of the magnets has a predetermined peak amplitude such that each rotor 12 oscillates approximately +/−thirty (30) degrees from a neutral position. However, the value of the peak amplitude is not critical to the design of the motor 10. Further, the predetermined period of the sinusoidal pattern may be selected to be any value for which the number of cycles of the sinusoidal pattern around the surface 64 of the stator 50" is an integer value.

As will be apparent to those skilled in the art, the first magnetic field need not be formed by the bar magnets 68" but could be formed from a single magnet. (or groups of magnets) such that the first magnetic field would be sinusoidally displaced around the armature axis of rotation 58 and would alternate in opposite directions between each peak of the sinusoidal pattern. Further, as will be appreciated by those skilled in the art, the displacement of the first magnetic field need not be precisely sinusoidal. For instance the displacement may be in a shape of a sawtooth or in a shape having a portion with constant plus and minus amplitude values, within the spirit and scope of the invention.

As a result of the first magnetic field being sinusoidally displaced and alternating each one-half period, each rotor 12 oscillates through an angle corresponding to approximately the peak amplitude of the sinusoid as the rotor 12 follows the stator magnets 68". Accordingly, a second difference between the third embodiment and the first embodiment is in the structure of the linkage 62. In the third preferred embodiment, shown in FIG. 1C, the linkage 62 comprises a reciprocating rod 91 connecting each rotor 12 to a respective first gear 87 rotationally attached to the armature 70. The reciprocating rod 91 is pivotally mounted to each rotor 12 and to each first gear 87 such that the oscillating motion of the rotor 12 is converted to rotary motion of the first gear 87. Each first gear 87 is coupled to a single second gear 89, fixedly attached to the stator 50. The rotary motion of each first gear 87 causes the armature 70 to rotate about the armature axis of rotation 58 as the rotors 12 oscillate about the rotor axis 16. As will be appreciated by those skilled in the art, the speed of the motor 10 is fixed by the ratio of the first gear 87 to the second gear 89 in accordance with the expression:

$$S_a = (1/N_s) \times S_r \quad (2)$$

Where:

$S_s$ is the angular velocity of the armature 70 (RPM);

$N_s$ is the number of first magnetic field periods around the stator 50"; and $S_r$ is the angular velocity of the rotor 12 (RPM).

Because each rotor 12 oscillates instead of continually rotating, only a single rotor magnet. (or group of magnets) on a given rotor 12 interacts with the single stator 50". Accordingly, a third difference between the third preferred embodiment and the first preferred embodiment arises because of the oscillatory motion of each rotor 12 whereby each rotor 12 of the third preferred embodiment has only a single pair of magnets 32. However, as will be appreciated by those skilled in the art, additional stators 50" may be added around the periphery of the rotors 12 and additional pairs of U-shaped magnets 20 may be included on each rotor 12 to magnetically interact with each additional stator 50", thus providing additional motive power.

Referring now to FIGS. 6, 7A and 8A–8B, there is shown a fourth preferred embodiment of the permanent magnet motor 10 for providing unidirectional rotational motive power. The fourth preferred embodiment comprises a generally circular stator 51 having a stator axis 72, attached to a base 18. The stator 51 includes an outer surface 64 divided into a first side 52 and a second side 54 by a circumferential line of demarcation 49, having a predetermined direction around the stator axis 72, at about a midpoint of the outer surface 64.

Preferably, the surface 64 of the stator 51 is arcuate, having a curvature conforming to the arc of the rotors 12. However, it will be appreciated by those skilled in the art that the surface 64 need not be arcuate but could be planar and still be within the spirit and scope of the invention. As will be appreciated by those skilled in the art the stator 51 is merely intended as a stationary supporting structure for stator magnets and, as such, the shape of the stator is not intended to be controlling of the size and shape of the air gap between the magnets attached to the stator and the magnets attached to the rotors.

Figure 8A:
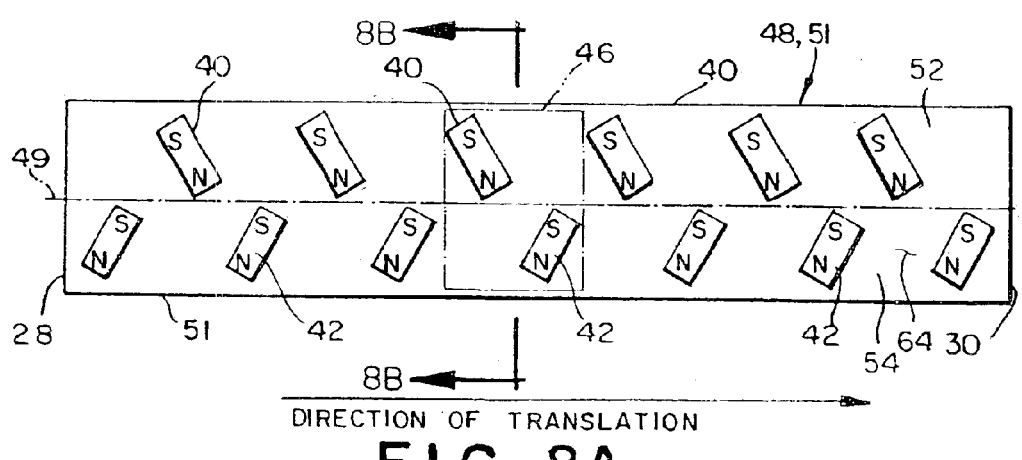
FIG. 8A is a schematic plan view of a stator used in the fourth, fifth, eighth and ninth preferred embodiments of the motor.
Figure 8B:
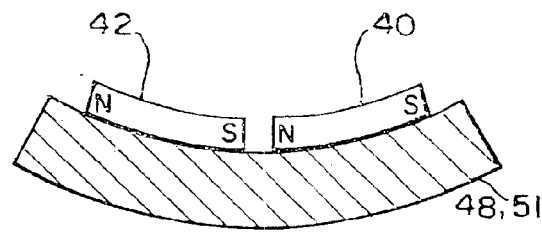
FIG. 8B is a schematic sectional view of the stator shown in FIG. 8A taken along the line 8B—8B.

As shown in FIG. 8A, one or more pairs of stator magnets 46 are attached to the outer surface 64 spaced along the line of demarcation 49. Each pair of stator magnets 46 comprises a first stator magnet 40 having a north pole and a south pole and a second stator magnet 42 having a north pole and a south pole. The south pole of each first stator magnet 40, is located on the first side 52 of the outer surface 64, and the north pole of the first stator magnet 40 is closest to the line of demarcation 49. The north pole of each second stator magnet 42 is located on the second side 54 of the outer surface 64 and the south pole of each second stator magnet 42 being closest to the line of demarcation 49. The first and the second stator magnets 40, 42 are spaced along the line of demarcation 49 such that a first intermagnet distance measured along the line of demarcation 49 between the north pole of the first stator magnet 40 and the south pole of the second stator magnet 42 of an adjacent pair of magnets 46 is generally equal to a second intermagnet distance measured along the line of demarcation 49 between the south pole of the first stator magnet 40 and the north pole of the second stator magnet 42.

In the fourth preferred embodiment, the stator magnets 40, 42 are bar magnets. Preferably, the north pole of each first stator magnet 40 and the south pole of each second stator magnet 42 are inclined toward the pre-determined direction. Also, the bar magnets are preferably oriented on the surface 64 of the stator 50 such that the south pole of each first magnet 40 and the north pole of each second magnet 42 are nearer to the periphery of each rotor 12 than the opposite polarity pole of each of the magnets 40, 42. As will be appreciated by those skilled in the art, the stator magnets 40, 42 need not be bar magnets. For instance, each stator magnet 40, 42 could be a U-shaped magnet, or could be made up of separate magnets, as long as the first magnetic field generated by the magnets was generally equivalent to that produced by the bar magnets.

In the fourth preferred embodiment, an armature 70 having an armature axis of rotation 58 coincident with the stator axis 72 is attached to the stator 51 by an armature axle 57, which armature axle 57 allowing the armature 70 to freely rotate about the stator axis 72. Each rotor 12 is spaced from the armature 70 by an armature strut 71 and is mounted to the armature strut 71 so as to be free to rotate about the rotor axis 16. The rotor axis 16 is oriented such that the rotor 12 rotates in a plane generally aligned with the armature axis of rotation 58. In the fourth preferred embodiment, five rotors 12 are attached to the armature 70. Preferably, the rotors 12 are uniformly spaced around the circumference of the stator 50 with a spacing of the rotors 12 as measured at the surface 64 the stator 51 about equal to an integer multiple of twice the intermagnet distance. However, as those skilled in the art will appreciate, it is not necessary to have the rotors 12 uniformly spaced. Further, the number of rotors 12 can be as few as one and as large as size and space constraints allow. As will be appreciated by those skilled in the art, the stator axis 72 need not be coincident with the armature axis of rotation 58. Accordingly, a stator 50 arranged around the armature axis 58 at any location at which the stator axis 72 is parallel to the armature axis 58 and the surface of the stator 50 faces the periphery of the rotors 12, thereby providing for the interaction between the first magnetic field and the second magnetic field around the armature axis 58, is within the spirit and scope of the invention.

Referring now to FIG. 7A, each rotor 12 comprises a first U-shaped magnet 20 generating a second magnetic field. The first U-shaped magnet 20 is positioned on the rotor 12 such that the north pole and the south pole of the first U-shaped magnet 20 faces toward the axis 16 of the rotor 12, and the rear side 26 of the first U-shaped magnet 20 faces the periphery of the rotor 12. When the rear 26 of the first U-shaped magnet 20 is adjacent to the north pole of one of the first stator magnets 40 along the line of demarcation 49, a portion of the second magnetic field directly adjacent to the rear 26 of the first U-shaped magnet 20 interacts with a portion of the first magnetic field generated by the north pole of the first stator magnet 40 to cause the rotor 12 to rotate in a counterclockwise direction. As the rotor 12 rotates in the counterclockwise direction, a portion of the second magnetic field associated with the south pole of the first U-shaped magnet 20 interacts with a portion of the first magnetic field associated with the south pole of the first stator magnet 40, giving rise to a force in the direction of the rotor axis 16, repelling the U-shaped magnet 20, and causing the rotor 12 to translate in the pre-determined direction around the stator axis. As the rotor 12 moves away from first stator magnet 40 in the pre-direction the second magnetic field adjacent to the rear 26 of the U-shaped magnet 20 interacts with the portion of the first magnetic field associated with the south pole of the second stator magnet 42 of the pair of magnets 46, causing the rotor 12 to reverse direction and rotate in the clockwise direction. The portion of the second magnetic field associated with the north pole of the U-shaped magnet 20 then interacts with the portion of the first magnetic field associated with the north pole of the second stator magnet 42, again giving rise to a force in the direction of the rotor axis 16, repelling the U-shaped magnet 20 and causing the rotor 12 to translate in the pre-determined direction. An oscillation cycle is then repeated with the second magnetic field of the rotor 12 interacting with the first magnetic field of the adjacent pair of magnets 46. Accordingly, the rotor 12 rotationally oscillates about the respective rotor axis 16 and generates a force in the direction of the rotor axis 16, causing the armature 70 to rotate in the pre-determined direction around the armature axis of rotation 58 to provide the unidirectional rotational motive power of the motor. As would be appreciated by those skilled in the art, the fourth embodiment is not limited to a single stator 51 and a single U-shaped magnet 20. Additional stators having first and second stator magnets 40, 42 arranged identically to the stator 51 to interact with corresponding U-shaped magnets spaced around the periphery of each rotor are with in the spirit and scope of the invention.

Figure 6:
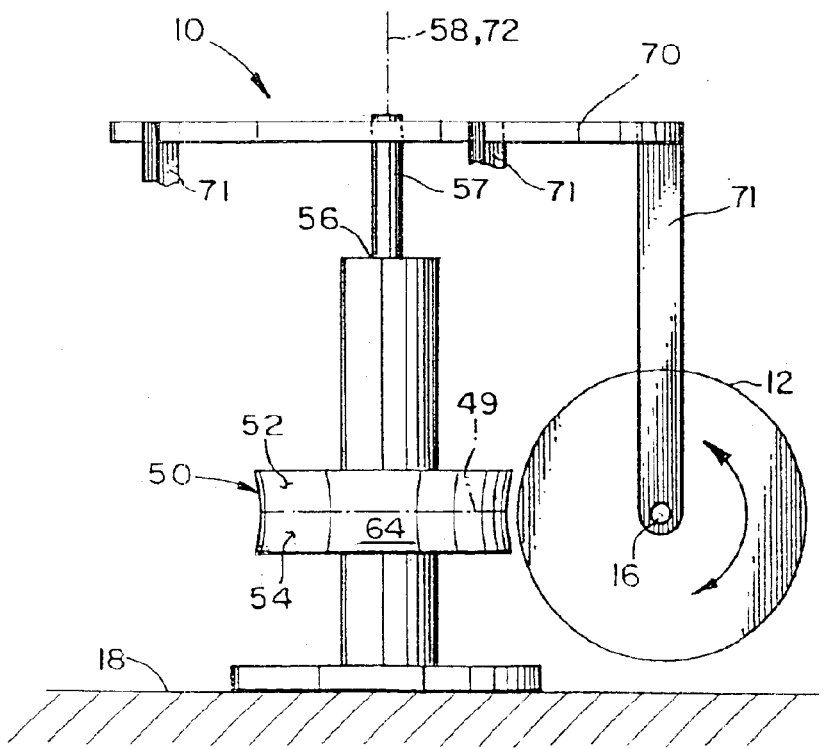
FIG. 6 is a schematic perspective view of a fourth through a seventh preferred embodiment of the motor.

Referring now to FIGS. 6, 7B and 8A there is shown a fifth preferred embodiment of the permanent magnet motor 10 for providing unidirectional rotary motive force. The structure and operation of the fifth preferred embodiment is similar to that of the fourth preferred embodiment except that each rotor 12 further includes a second U-shaped magnet 24 having a north pole and a south pole with the south pole of the second U-shaped magnet 24 abutting the north pole of the first U-shaped magnet 20, and a third U-shaped magnet 22 having a north pole and a south pole, with the north pole of the third U-shaped magnet 22 abutting the south pole of the first U-shaped magnet 20. As the rotor 12 rotates due to interaction of the portion of the second magnetic field adjacent to the rear of the U-shaped magnet 20 with the first magnetic field, a third magnetic field generated by the north pole of the second U-shaped magnet 24 and a fourth magnetic field generated by the south pole of the third U-shaped magnet 22 each interact with the first magnetic field generated by each stator magnet pair 46 to cause each rotor 12 to generate a force in the direction of the rotor axis 16, thereby causing the armature 70 to rotate in the pre-determined direction around the axis 58 of the stator 51 to provide the unidirectional rotational motive power of the motor. In the fifth preferred embodiment, the portion of the second magnetic field adjacent to the rear 26 of the first U-shaped magnet 20 serves to rotate the rotor 12 while the second and third U-shaped magnets 24, 22 generate the magnetic fields providing the force in the direction of the rotor axis 16. Accordingly, the fifth preferred embodiment is potentially more powerful than the fourth preferred embodiment as will be appreciated by those skilled in the art, the stator magnets 40, 42 need not be bar magnets. For instance, each stator magnet 40, 42 could be replaced by a U-shaped magnet or could be made up of separate magnets, as long as the first magnetic field generated by the magnets was generally equivalent to that produced by the bar magnets.

Figure 8C:
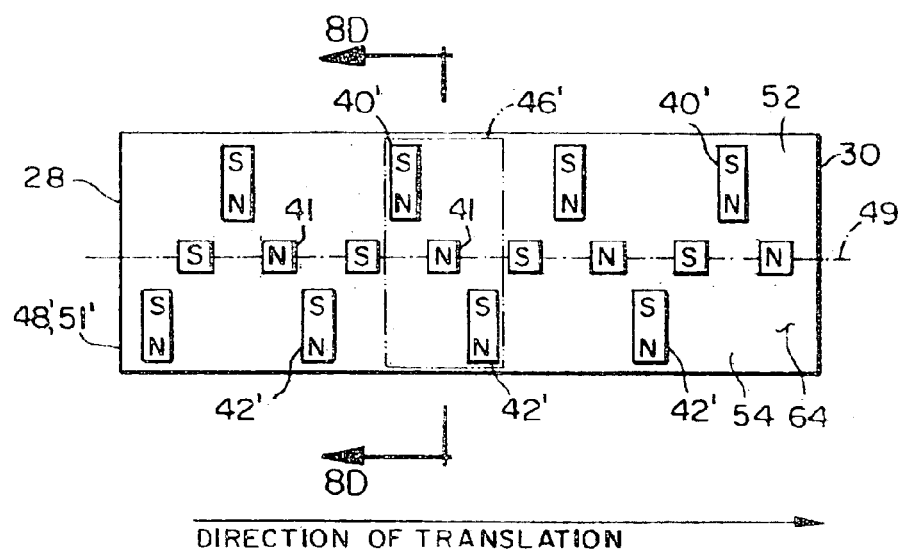
FIG. 8C is a schematic plan view of a stator used in the sixth and in the tenth preferred embodiments of the motor.
Figure 8D:
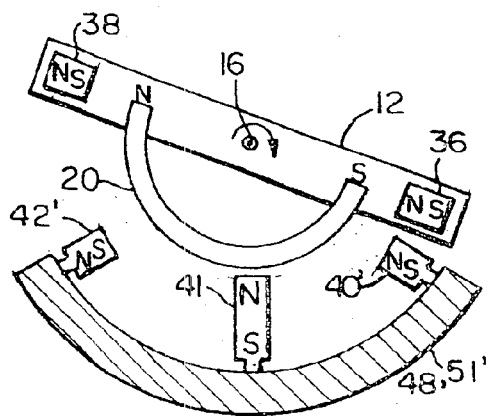
FIG. 8D is a schematic elevational view of the stator shown in FIG. 8C taken along the line 8D—8D shown with the rotor shown in FIG. 7C.

Referring now to FIGS. 6 and 8C–8D there is shown a sixth preferred embodiment of the motor 10. The structure and operation of the sixth preferred embodiment is identical to that of the fifth preferred embodiment except that: (1) the stator magnets 40', 42' on the surface 64 of the stator 51' are in a slightly different orientation; (2) an additional stator magnet 41 is added to each pair of stator magnets 46 and (3) the U-shaped magnets 22, 24 attached to each rotor 12 are replaced with bar magnets 36, 38: Specifically, and referring now to FIG. 8C, the direction of magnetization of each first stator magnet 40' and each second stator magnet 42' is aligned to be generally perpendicular to the line of demarcation 49 instead of being inclined in the pre-determined direction around the armature axis of rotation 58 as in the fifth embodiment. Also, the stator 51' also includes a third stator magnet 41 mounted on the outer surface 64 along the line of demarcation 49 midway between each first stator magnet 40' and each second stator magnet 42'. As shown in FIGS. 8C–8D, the third stator magnet 41 is oriented so that the direction of magnetization of the third magnet 41 is aligned with the axis 16 of the rotors 12.

As shown in FIGS. 8C and 8D, the rotor 12 used in the sixth preferred embodiment includes a first U-shaped magnet 20, similar to that of the fifth preferred embodiment. However, in place of the second and the third U-shaped magnets 24, 22 used in the fifth preferred embodiments, the sixth preferred embodiment includes a first thruster bar magnet 36, spaced from and proximate to the south pole of the first U-shaped magnet 20 and generally aligned with a thruster magnet axis 34, and a second thruster bar magnet 38, spaced from and proximate to the north pole of the first U-shaped magnet 20 and also generally aligned with the thruster magnet axis 34. The thruster axis 34 lays in the plane of the rotor 12 and intersects the rotor axis 16. Similar to the fifth preferred embodiment, the interaction of the portion of the second magnetic field directly adjacent to the rear of the U-shaped magnet 20 with the first magnetic field provides the rotational force for the rotors 12. As the rotor 12 rotates in the clockwise direction (viewed from the second end 30 of the stator 51'), a third magnetic field generated by both the north pole and the south pole of the second thruster magnet 36 interacts with the first stator magnet 40', again generating a force in the direction of the rotor axis 16. Similarly, when the rotor 12 rotates in the counterclockwise direction a fourth magnetic field generated by both the north pole and the south pole of the first thruster magnet 38 interacts with second stator magnet 42', generating a force in the direction of the rotor axis 16. The result of the force in the direction of the rotor axis 16 is to cause the armature 70 to rotate in the pre-determined direction around the armature axis of rotation 58 to provide the unidirectional rotational motive power of the motor 10.

In the sixth preferred embodiment, the stator magnets 40', 41, 42' and the thruster magnets 36, 38 are bar magnets.

However, as will be appreciated by those skilled in the art, the stator magnets 40', 41 42' and the thruster magnets 36, 38 need not be bar magnets. For instance, each stator magnet 40', 42' could be a U-shaped magnet or could be made up of separate magnets, as long as the first magnetic field generated by the magnets was generally equivalent to that produced by the bar magnets.

Figure 8E:
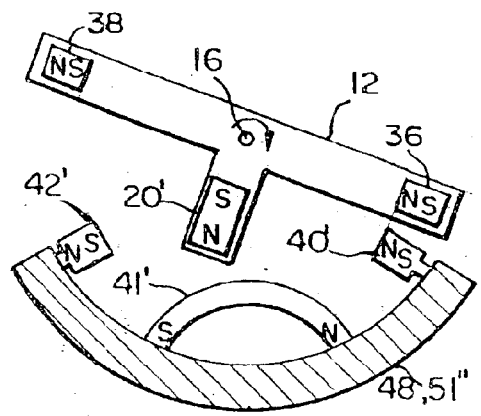
FIG. 8E is a schematic elevational view of an alternative stator shown with the rotor shown in FIG. 7D.
Figure 9:
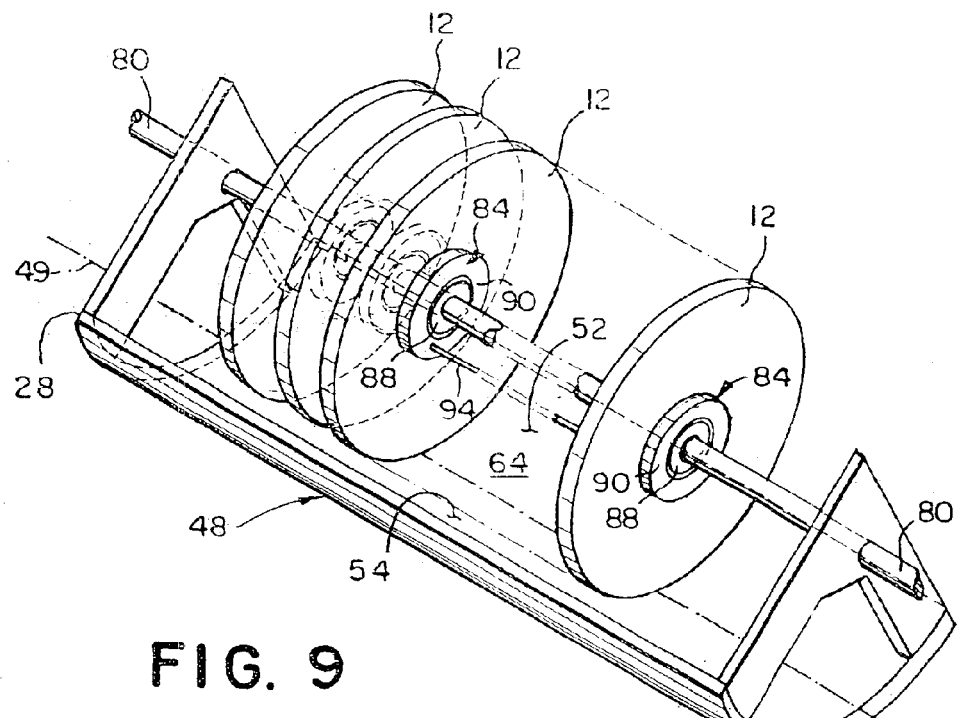
FIG. 9 is a schematic perspective view of the eighth through an eleventh preferred embodiment of the motor.

Referring now to FIGS. 6, 7D and 8E there is shown a seventh preferred embodiment of the motor 10. The structure and operation of the seventh preferred embodiment is similar to the sixth preferred embodiment except that the third stator magnet 41' located on the surface 64 of the stator 51" along the line of demarcation 49 is a U-shaped magnet 41' with the rear of the U-shaped magnet 41' facing the rotor 12 and the direction of magnetization being perpendicular to the line of demarcation 49; and the U-shaped magnet 20 is replaced with a bar magnet 20' oriented to have the direction of magnetization aligned with a radial line of the rotor 12. As in the sixth preferred embodiment, each stator magnet 40', 42' could be a U-shaped magnet or could be made up of separate magnets, as long as the first magnetic field generated by the stator magnets 40', 42' was generally equivalent to that produced by the bar magnets.

Referring now to FIGS. 7A, 8A, 8B, 9 and 11A there is shown an eighth preferred embodiment of the motor 10 for providing unidirectional linear motive power. The eighth preferred embodiment comprises a linear stator 48 having a generally arcuate cross section perpendicular to a longitudinal line of demarcation 49 extending on a surface 64 of the stator between a first end 28 and a second end 30 and dividing the surface 64 of the stator 48 into a first side 52 and a second side 54. Preferably, the generally arcuate cross-section of the stator 48 is concave. However, it will be appreciated by those skilled in the art that the cross-section need not be concave but could be planar or even convex and still be within the spirit and scope of the invention.

The linear stator 48 is identical to the generally circular stator 51 except for the surface 64 of the stator 48 being linear in the direction of the line of demarcation 49 instead of being circular in the direction of the line of demarcation 49.

The eighth preferred embodiment includes the first and the second stator magnets 40, 42 (see FIG. 8A), the location and orientation of which are virtually identical to the orientation and location of the stator magnets 40, 42 on the circular stator 51. Accordingly, attached to the linear stator 48 is one or more pairs of magnets 46, each pair of stator magnets 46 generating a first magnetic field and comprising a first stator magnet 40 having a north pole and a south pole and a second stator magnet 42 having a north pole and a south pole. The south pole of each first stator magnet 40, is located on the first side 52 of the outer surface 64, with the north pole of the first stator magnet 40 being closest to the line of demarcation 49. The north pole of each second stator magnet 42 is located on the second side 54 of the outer surface 64 with the south pole of each second stator magnet 42 being closest to the line of demarcation 49. The first and the second stator magnets 40, 42 are spaced along the line of demarcation 49 such that a first intermagnet distance measured along the line of demarcation 49 between the north pole of the first stator magnet 40 and the south pole of the second stator magnet 42 of an adjacent pair of magnets 46 is generally equal to a second intermagnet distance measured along the line of demarcation 49 between the south pole of the first stator magnet 40 and the north pole of the second stator magnet 42.

In the eighth preferred embodiment, the stator magnets 40, 42 are bar magnets, the north pole of each first stator magnet 40 and the south pole of each second stator magnet 42 being inclined toward the second end 30 of the linear stator 48. Also, as shown in FIG. 8A, the stator magnets 40, 42 are oriented on the surface 64 of the stator 51 such that the south pole of each first magnet 40 and the north pole of each second magnet 42 are nearer to the periphery of each rotor 12 than the opposite polarity pole of each of the stator magnets 40, 42. As will be appreciated by those skilled in the art, the stator magnets 40, 42 need not be bar magnets. For instance, each stator magnet 40, 42 could be a U-shaped magnet or could be made up of separate magnets, as long as the first magnetic field generated by the magnets was generally equivalent to that produced by the bar magnets.

The eighth preferred embodiment also includes rail 80 having a longitudinal axis located generally parallel to the line of demarcation 49 of the stator 48. Five rotor assemblies 14 comprising a rotor 12 and a bearing assembly 84 are slidably attached to the rail 80.

Figure 11A:
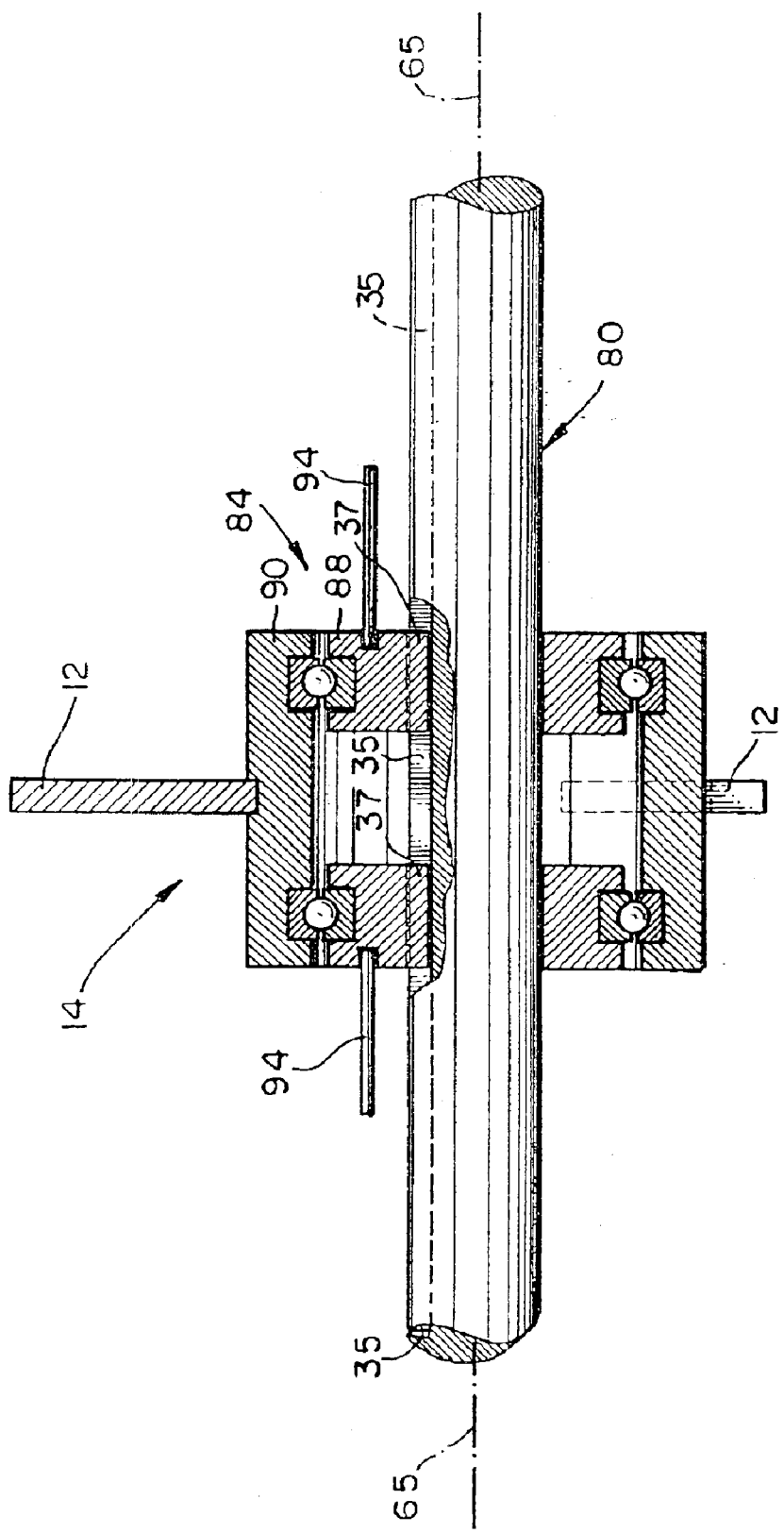
FIG. 11A is a plan view of a rotor assembly used in the eighth through the eleventh preferred embodiments.

Preferably, the bearing assembly 84, as shown in FIG. 11A, includes a pair of first bearings 88 slidably mounted to the rail 80 and constrained to slide along the rail without any substantial rotation, by a boss 37 in each first bearing 88, which is keyed to a longitudinal groove 35 on the rail 80. A second bearing 90 is connected for rotation to the pair of first bearings 88 by ball bearings. The rotor 12 is attached to the second bearing 90. Thus, the rotor 12 attached to each bearing assembly 84 is free to rotationally oscillate about the rail 80 and to generate a force along the rail 80 in the direction of the second end of the stator 30.

Preferably, the eighth preferred embodiment includes a cross-link 94 which ties each bearing assembly 84 together by connecting together the first bearings 88 of each bearing assembly 84, thereby adding together the linear motion along the rail 80 of each rotor 12.

Preferably, each rotor 12 comprises one or more one rotor magnets 20, each rotor magnet 20 generating a second magnetic field which interacts with the first magnetic field to cause the rotor 12 to rotationally oscillate about the axis of the rail 80 and to generate a force in the direction of the axis of the rail 80 to provide the unidirectional linear motive power of the motor. In the eighth preferred embodiment, each rotor 12 is substantially identical to the rotor 12 described for the fourth preferred embodiment. Accordingly, each rotor magnet comprises a first U-shaped magnet 20 having a north pole, a south pole and a rear side 26, a first portion of the second magnetic field directly adjacent to the rear 26 of the U-shaped magnet 20 interacting with each first magnetic field to cause each rotor 12 to rotationally oscillate about the rail 80. A second portion of the second magnetic field adjacent to the north and the south poles of the first U-shaped magnet 20 interacts with the first magnetic field to cause the rotor 12 to generate a force in the direction of the axis of the rail 80 thereby providing the unidirectional linear motive power of the motor. As would be clear to those skilled in the art, the operation of the eighth preferred embodiment is identical to that of the fourth preferred embodiment except that the motion of the cross-linked rotors 12 is linear along the rail 80 instead of being rotational about the armature axis of rotation 58. Accordingly, for the sake of brevity, a description of the operation of the eighth preferred embodiment is not repeated.

Referring now to FIGS. 7B, 8A, 8B, 9 and 11A there is shown a ninth preferred embodiment of the motor 10 for providing unidirectional linear motive power. As would be apparent to those skilled in the art, the structure and the operation of the ninth preferred embodiment is virtually identical to that of the fifth preferred embodiment except that the motion of the cross-linked rotors 12 is linear instead of rotational about the armature axis of rotation 58. Accordingly, for the sake of brevity, a description of the structure and the operation of the ninth preferred embodiment is not repeated.

Referring now to FIGS. 7C, 8C, 8D, 9 and 11A there is shown a tenth preferred embodiment of the motor 10 for providing unidirectional linear motive power. As would be apparent to those skilled in the art, the structure and the operation of the tenth preferred embodiment is virtually identical to that of the sixth preferred embodiment except that the motion of the cross-linked rotors 12 is linear instead of rotational about the armature axis of rotation 58. Accordingly, for the sake of brevity, the operation of the tenth preferred embodiment is not repeated.

Referring now to FIGS. 7D, 8C, 8E, 9 and 11A there is shown an eleventh preferred embodiment of the motor 10 for providing unidirectional linear motive power. The structure and operation of the eleventh preferred embodiment is virtually identical to the seventh preferred embodiment except that the motion of the cross-lined rotors 12 is linear instead of rotational about the armature axis of rotation 58. Accordingly, for the sake of brevity, the operation of the tenth preferred embodiment is not repeated.

Referring now to FIGS. 2, 3, 10 and 11B, there is shown a twelfth preferred embodiment of the motor 10 for providing linear motive power.

Figure 10:
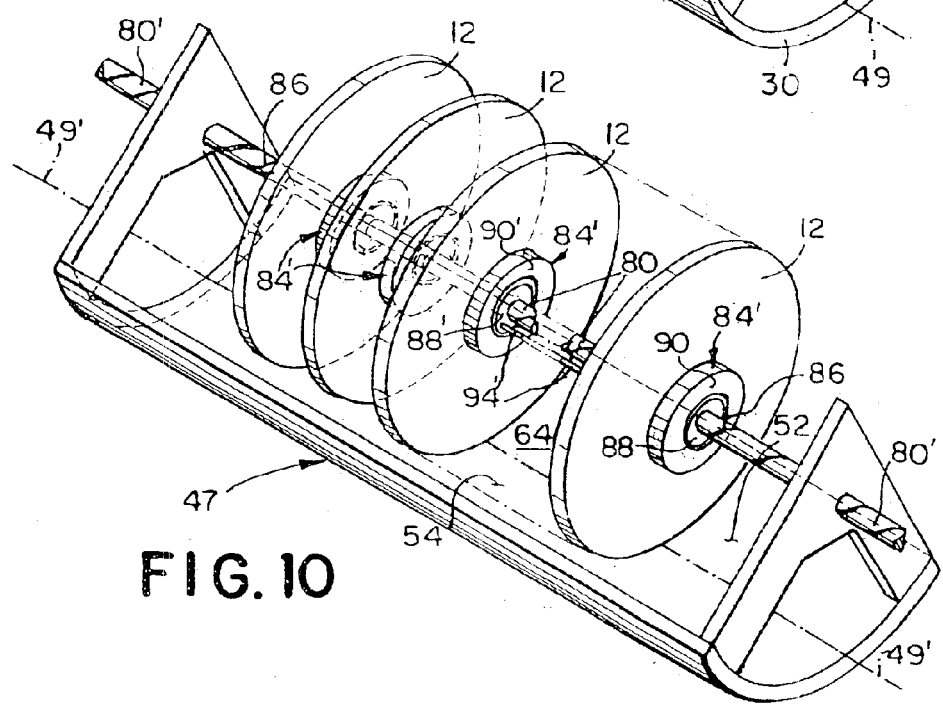
FIG. 10 is a schematic perspective view of a twelfth preferred embodiment of the motor.

As shown in FIG. 10, the twelfth preferred embodiment comprises a linear stator 47 having a generally arcuate cross-section perpendicular to a line of demarcation 49' extending along a midpoint of the stator 47 between a first end 28 and a second end 30 of the linear stator 47, a rail 80' connected to the linear stator 47 having an axis generally parallel to the line of demarcation 49', one or more rotor assemblies 14' comprising rotors 12 connected to the rail 80' by a bearing assembly 84', and a cross-link 94' connecting together the linkages 84' of adjacent rotors 12. Preferably, the generally arcuate cross section of the stator 47 is concave, having a curvature conforming to the arc of the rotors 12. However, it will be appreciated by those skilled in the art that the generally arcuate cross-section need not be concave but could be planar or even convex and still be within the spirit and scope of the invention.

As shown in FIG. 3, the linear stator 47 includes one or more magnets 68 arranged on the surface 64 of the linear stator 47, each magnet 68 having a direction of magnetization directed at about a right angle to the line of demarcation 49' and resulting in a first magnetic field directed generally at a right angle to the line of demarcation 49'. The magnitude of the first magnetic field is generally uniform except in the null region 78, in which the magnitude of the first magnetic field is substantially reduced. The linear stator 47 of the twelfth preferred embodiment is virtually identical to the circular stator 50 of the first preferred embodiment except the linear stator 50 is linear in the direction of the line of demarcation 49' instead of being circular around the armature axis of rotation 58. Also, the arrangement of the magnets 68 on the surface 64 of the stator 47 and the structure of the null region(s) 78 is the same as for the first preferred embodiment, as shown in FIG. 3 and as fully described in the discussion of the first embodiment. Accordingly, for the sake of brevity, a more detailed description of the structure of the linear stator 47 is not repeated.

The rotors 12 of the twelfth preferred embodiment each have an axis of rotation 16 that is aligned with an axis of the rail 80'. The rotors 12 are connected to the rail 80' by the bearing assembly 84' such that each rotor 12 is free to rotate about the rail 80' and to slide along the rail 80'. Preferably, as shown in FIG. 2, each rotor 12 includes three pairs of U-shaped magnets 32, 32, 32', each U-shaped magnet having a rear side 26 and generating a second magnet field. A portion of the second magnetic field adjacent to the rear-side 26 of each U-shaped magnet 20 interacts with the first magnetic field to cause each rotor 12 to rotate about the axis of the rail 80. The rotors 12 of the twelfth preferred embodiment are the same as the rotors in the first preferred embodiment, as described in FIG. 2 and fully discussed above. Accordingly, for the sake of brevity, the detailed description of the rotors 12 is not repeated.

Figure 11B:
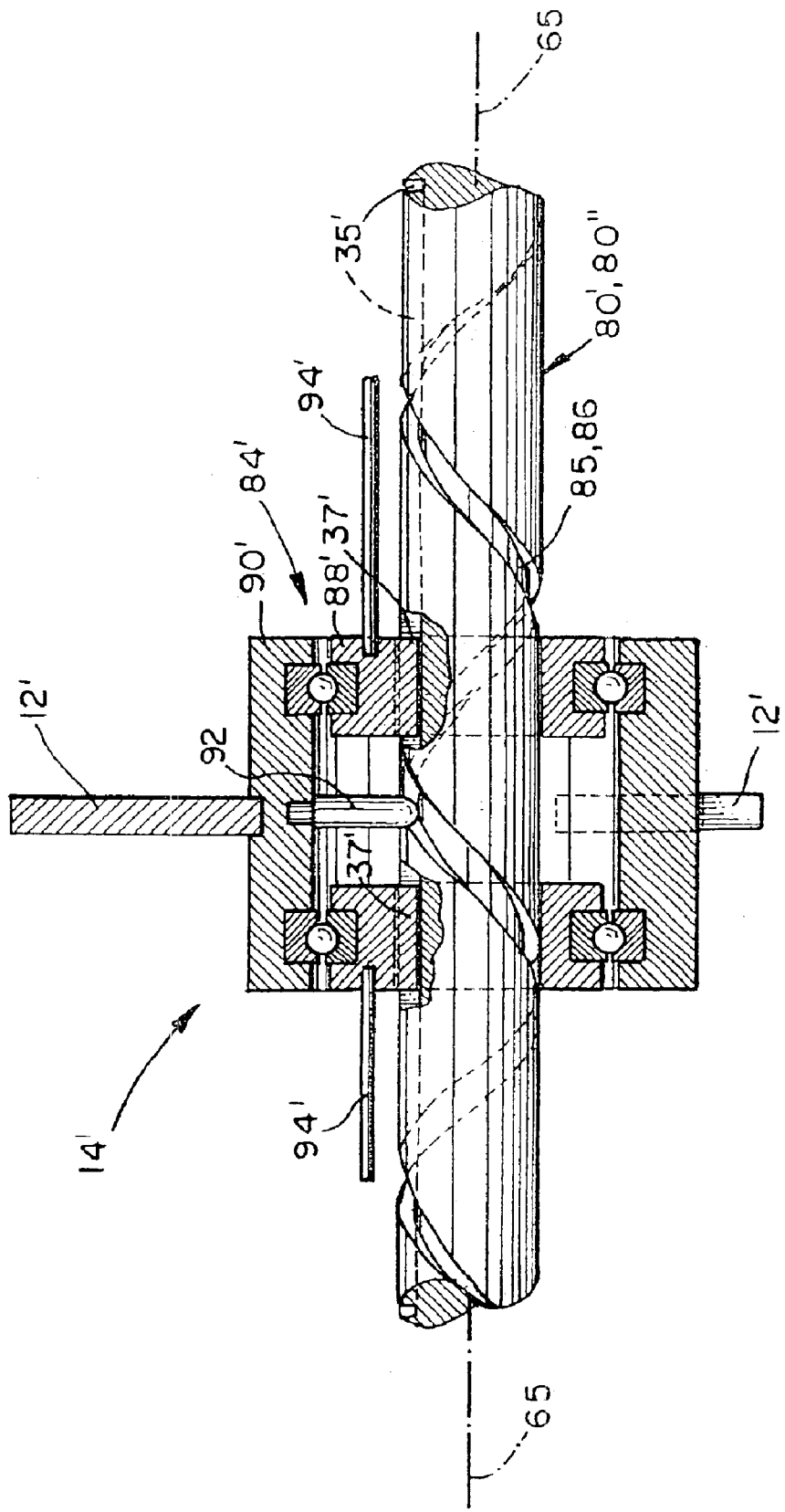
FIG. 11B is a plan view of a rotor assembly used in the twelfth through a sixteenth preferred embodiment.
Figure 13:
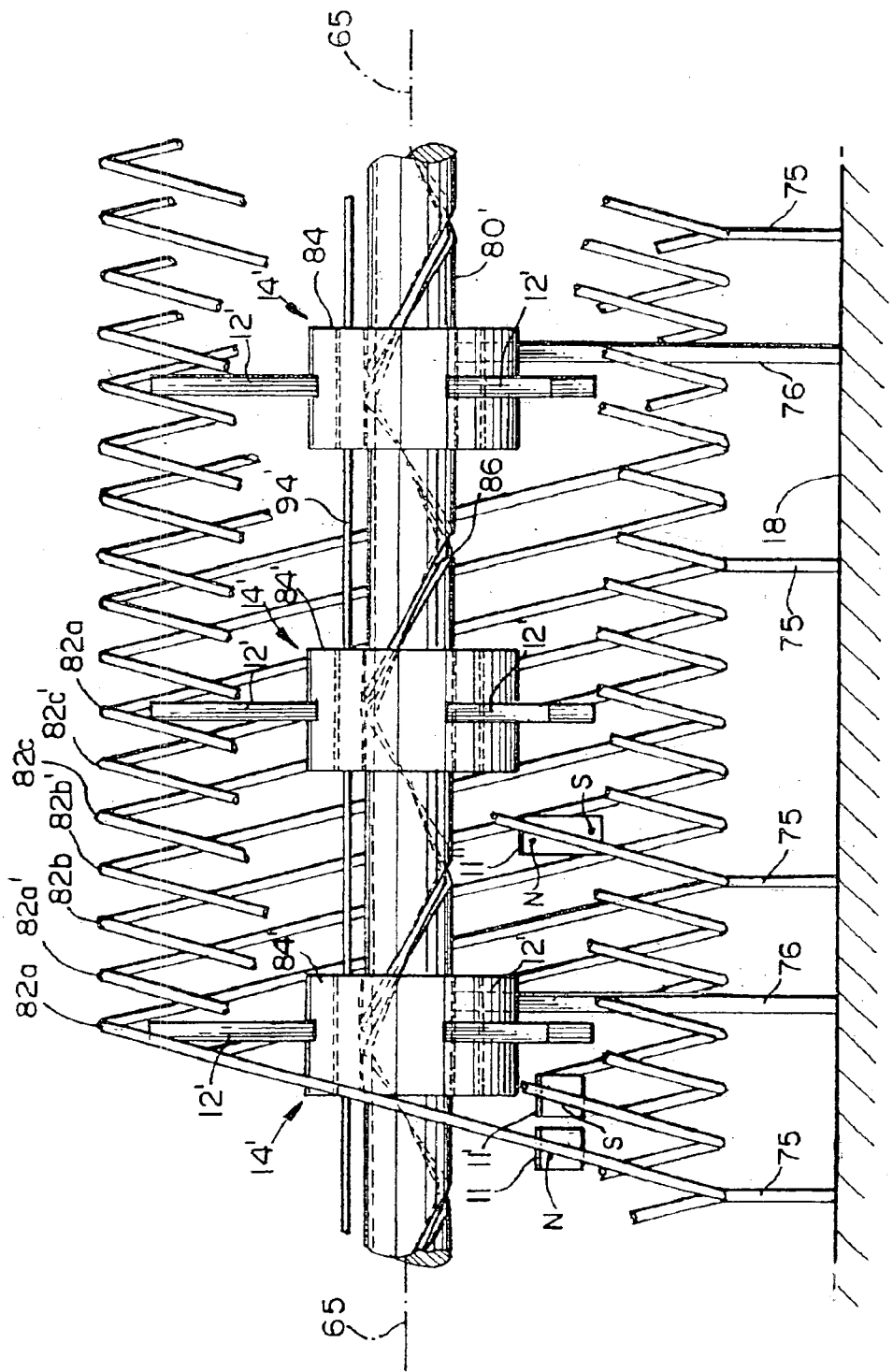
FIG. 13 is an elevational view of a thirteenth preferred embodiment of the motor.

As shown in FIG. 11B, the rail 80' has a helical groove 86 with a pre-determined pitch (i.e., turns/unit length) running around a periphery of the rail 80'. The bearing assembly 84' connects each rotor 12 to the helical groove 86, converting the rotational motion of each rotor 12 around the rail 80' to the linear motion along the rail 80'. As shown in FIG. 11B, the bearing assembly 84' comprises a pair of first bearings 88' mounted to the rail 80' and constrained to slide along the rail 80' without any substantial rotation, and a second bearing 90', mounted to an outer surface the first bearing 88' for receiving the rotor 12. Preferably, each first bearing 88' has a boss 37 which engages a longitudinal groove 35 such that each first bearing 88' slides on the rail 80' without rotation as the second bearing 90' rotates on the first bearings 88'. It will be appreciated by those skilled in the art, other methods for securing the first bearings 88' to the rail 80' could be employed, as for instance, by making the cross-section of the rail 80' oblate.

As in the first preferred embodiment, each rotor 12 must rotate at a rate which results in the rear of each U-shaped magnet 20 on the rotor 12 passing through one of the null regions 78 each full rotation of the rotor 12. Accordingly, the pre-determined pitch of the helical groove 86 on the rail 80' preferably equals:

$$P_g = (1/N_r) \times P_r \qquad (3)$$

Where:

Pr=the pitch of the null regions 78 (null regions/unit length);

$N_r$=the number of U-shaped magnets (or groups of abutted U-shaped magnets) on a rotor 12; and $P_g$=the pitch of the helical groove 86 (revolutions/unit length).

Preferably, the portions of the helical groove 86 corresponding to each null region 78 have an instantaneous pitch which is greater than the pre-determined pitch of the groove 86 for increasing the angular velocity of the each rotor 12 as each one of the pairs 32, 32', 32" of U-shaped magnets 20 passes through one of the null regions 78. However, as will be appreciated by those skilled in the art, it is not necessary to provide the greater instantaneous pitch in order for the motor 10 to provide motive power.

As described above, the cross-link 94' connects the bearing assembly 84' of adjacent rotors 12 together. As shown in FIG. 10, the cross-link 94' connects the first bearings 88' of each bearing assembly 84' to the first bearing 88' of the adjacent bearing assemblies 84' so that the linear motion of all the rotor assemblies 14' are added together to provide the unidirectional linear motive power of the motor 10.

As previously stated, the first preferred embodiment of the motor 10 comprises a single null region 78 and five rotors 12, each rotor 12 having three pairs 32, 32', 32" of abutted U-shaped magnets 20. Preferably, the rotors 12 are uniformly spaced along the rail 80' and the pairs 32, 32', 32"

of U-shaped magnets 20 are uniformly spaced around the periphery of each respective rotor 12. Further, the pairs 32, 32', 32" of U-shaped magnets 20 are phased with respect to each rotor 12 by one-fifth of a revolution of the rotor 12 so that the pairs 32, 32', 32" of U-shaped magnets 20 of all the rotors 12 pass through the null region 78 at a substantially uniform rate to provide a more or less continuous interaction between the first magnetic field and the second magnetic field of the rotors 12, resulting in a more or less continuous urging of the rotor assemblies 14' toward the second end of the stator 47. As will be appreciated by those skilled in the art, the motive power provided by the motor 10 is proportional to the number of rotors 12 and the number of U-shaped magnets 20 on each rotor 12. Accordingly, the number of rotors 12 and the number of pairs 32, 32', 32" of magnets 20 of the present invention are not limited to five rotors 12 and three pairs 32 of U-shaped magnets 20. Neither is the number of null regions limited to one. The number of U-shaped magnets 20 and null regions 78 are limited only by adherence to the rule established by equation 3.

Referring now to FIGS. 2, 11B, 12 and 13 there is shown a thirteenth preferred embodiment of the motor 10 comprising a rail 80' supported by rail mounting posts 76 and having a longitudinal axis 65. A helical groove 86 having a pre-determined pitch runs around a periphery of the rail 80.

The thirteenth preferred embodiment also includes three first helical stators 82a, 82b, 82c (82) concentrically surrounding the rail 80' corresponding to three pairs 32, 32' 32" of U-shaped magnets 20 mounted on each of five rotors 12. Preferably, the first helical stators 82 have the same pitch as the pre-determined pitch of the groove 86 and a longitudinal axis generally parallel to the axis 65 of the rail 80'. A plurality of first stator magnets 11 having a direction of magnetization aligned with a radial line of each rotor 12 are spaced along each first helical stator 82 with the first stator magnets 11 generating a first magnetic field.

The thirteenth preferred embodiment further includes plurality of second helical stators 82a', 82b', 82c' (82') alternating with the first helical stators 82' along the axis 65 of the rail 80', and having the pre-determined pitch of the groove 86. Each second helical stator 82' has mounted upon it a plurality of second stator magnets 11' having a direction of magnetization aligned with a radial line of the rotor 12 and having a direction of magnetization opposite in direction to the first stator magnets 11 mounted on each of the first helical stators 82. As a consequence of the second helical stators 82' being located midway between the first helical stators 82, a point at about a midpoint between each rotor magnet pair 32, 32', 32" is apposite to one of the second helical stators 82' as each rotor 12 rotates about the axis 65 of the rail 80' and slides along the rail 80'.

The thirteenth preferred embodiment also includes five rotors 12, (only three are shown for clarity), having an axis of rotation 16 generally aligned with the longitudinal axis 65 of the rail 80'. Each rotor 12 is connected to the rail 80' by a bearing assembly 84' such that the rotor 12 is free to rotate about the axis 65 of the rail 80' and slide along the rail 80'. Preferably, each rotor 12 includes three pairs 32, 32', 32" of U-shaped magnets 20 wherein each U-shaped magnet 20 generates a second magnetic field, a portion of which adjacent to a rear 26 of the pair of U-shaped magnets 20 interacts with the first magnetic field of each first stator magnet to cause each rotor 12 to rotate about the axis 65 of the rail 80'.

The bearing assembly 84' (shown in detail in FIGS. 11B and 12) connects each rotor 12 to the helical groove 86 around the periphery of the rail 80. The bearing assembly 84' is similar to the bearing assembly 84' described in the twelfth preferred embodiment except for the openings in the first bearings 88' and in the second bearing 90' which allow the bearing assembly 84' past the rail mounting posts 76 as the bearing assembly 84' moves along the rail 80'.

The thirteenth preferred embodiment may be constructed as either a linear motor or a rotary motor. In the case of the linear motor, the axes of the rail 80' and of each helical stator 82 are substantially straight. The rail 80' is supported on the base 18 by rail mounting posts 76 placed at intervals along the rail 80'. The posts 76 are situated at locations along the rail 80' at which the rotation of the rotor 12 orients the openings in the first and second bearings 88', 90' to correspond to the mounting posts 76. Each helical stator 82a, 82b, 82c is supported on the base by stator mounting posts 75. The rotors 12 are connected together by a cross-link 94' which connects the first bearings 88' of each bearing assembly 84' to the first bearing 88' of the bearing assembly 84' of an adjacent rotor 12. In this manner, the rotational motion of each rotor assembly 14' is added together to provide the linear motive power of the linear motor.

Figure 14:
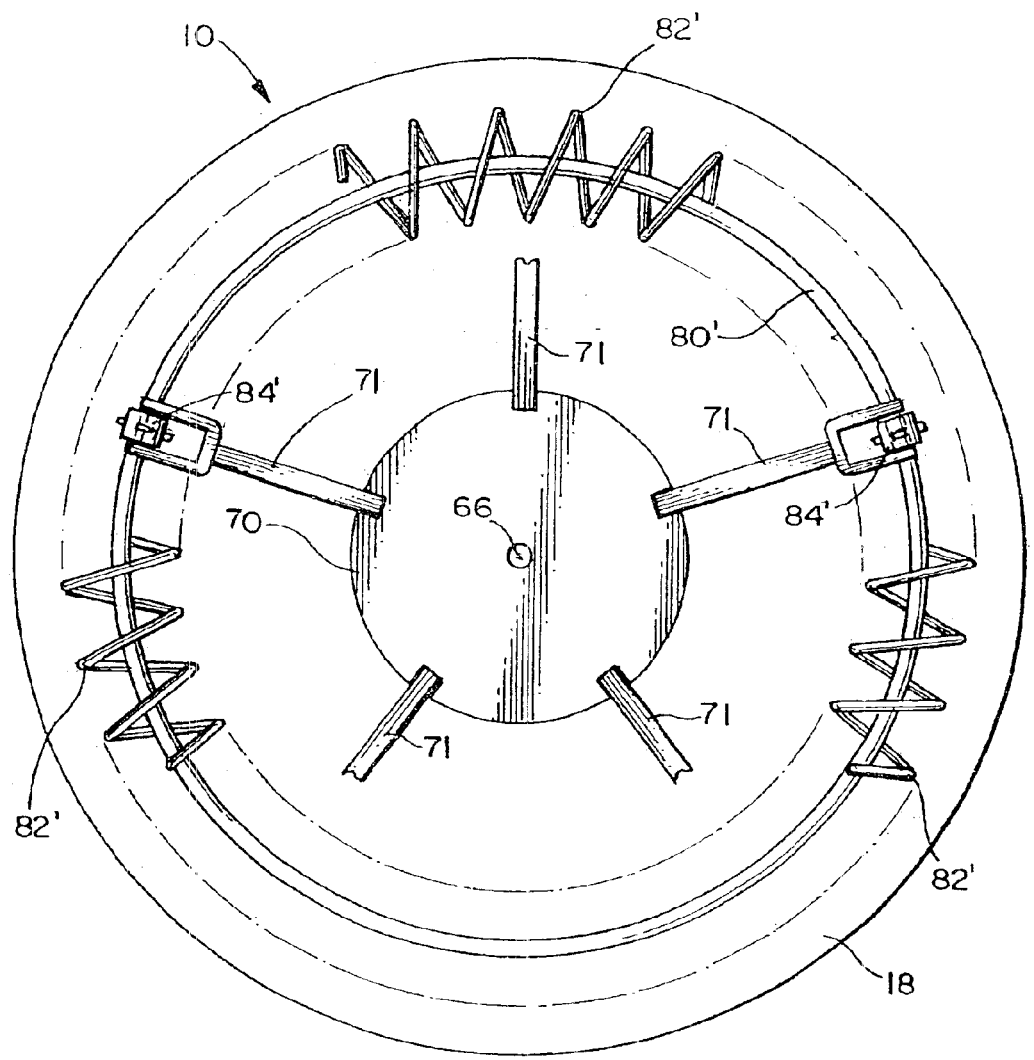
FIG. 14 is a plan view of a rotary configuration of the thirteenth preferred embodiment.

The thirteenth preferred embodiment may also be constructed as a rotary motor 10 as shown in FIG. 14. In this case, the axes of the rail 80' and the helical stators 82 are configured to be circular. The circularly configured motor 10 includes an armature 70 centrally located within the perimeter of the rail 80'. The armature 70 rotates about an armature axis of rotation 58 connected for rotation within a motor base 18 to which the rail 80' is also attached by mounting posts 76 (not shown). The pitch of the first and the second helical stators 82, 82', measured at a radius of the rail 80, preferably equals the pre-determined pitch of the helical groove 86. The armature 70 is fixedly attached to the first bearing 88 (see FIG. 11B) of each bearing assembly 84' by an armature strut 71 thereby adding together the rotational motive power of each rotor assembly 14. In order that the armature strut 71 does not interfere with the first and second helical stators 82, 82', the first and second helical stators 82, 82' are made to have an opening toward the armature axis of rotation 58.

Preferably, each first helical stator 82a, 82b, 82c has mounted upon it a plurality of first stator magnets 11 with each stator magnet 11 having a direction of magnetization aligned with a radial line of the rotor 12. Preferably, the first helical stators 82 are uniformly spaced along the longitudinal axis 65 of the rail 80' with each first helical stator 82 corresponding to one of the plurality of magnet pairs 32, 32', 32". Preferably, each rotor 12 is positioned on the rail 80' such that one of the rotor magnet pairs 32, 32', 32" is apposite to one of the corresponding first helical stators 82 as the rotor 12 rotates about the axis 65 of the rail 80 and slides along the rail 80'. However, as those skilled in the art will appreciate, the rotor magnet pairs 32, 32', 32" need not be directly apposite to each helical stator 82 as the rotors 12 rotate in order to generate a rotational force.

Alternatively, as will be appreciated by those skilled in the art, the motor 10 can be constructed without the second helical stator 82'. In the simplest case the motor 10 could comprise only a single first helical stator 82 and a single rotor 12 comprising a single U-shaped magnet 20 generating the second magnetic field. The single rotor 12 is preferably positioned in the groove 86 on the rail 80' such that the U-shaped rotor magnet 20 is continually apposite to the single first helical stator 82. Consequently, a portion of the second magnetic field directly adjacent to a rear 26 of the U-shaped magnet 20 interacts with the first magnetic field generated by each first stator magnet 11" mounted on the helical stator 82 to cause the rotor 12 to rotate about the axis 65 of the rail 80 and to slide along the rail 80'. Preferably, when only a single first stator 82 set of first stators 82 is used, each first stator magnet 11' has a direction of magnetization oriented to be in the plane of the rotor 12 and generally perpendicular to a radial line of the rotor 12. The north pole and the south pole of the first stator magnet 11' are preferably spaced apart so that when one pole of the first stator magnet 11 is directly apposite to the rotor magnet 20, the pole of opposite polarity is equally spaced from the U-shaped magnet 20 of the rotor 12. As one skilled in the art would appreciate, a plurality of U-shaped rotor magnets 20 and corresponding first helical stators could be used. Further, as those skilled in the art will appreciate, other configurations of the rotor magnet 20 and the stator magnet 11 are possible, all of which rely on the novel attributes of the magnetic field adjacent-to the rear 26 of a U-shaped rotor magnet 20. For example, the previously described stator magnet 11" perpendicular to the radial line of the rotor 12 could be two separate bar magnets, spaced apart, with the magnetization of each of the two magnets aligned with a radial line of the rotor and having opposite directions of magnetization.

Figure 15A:
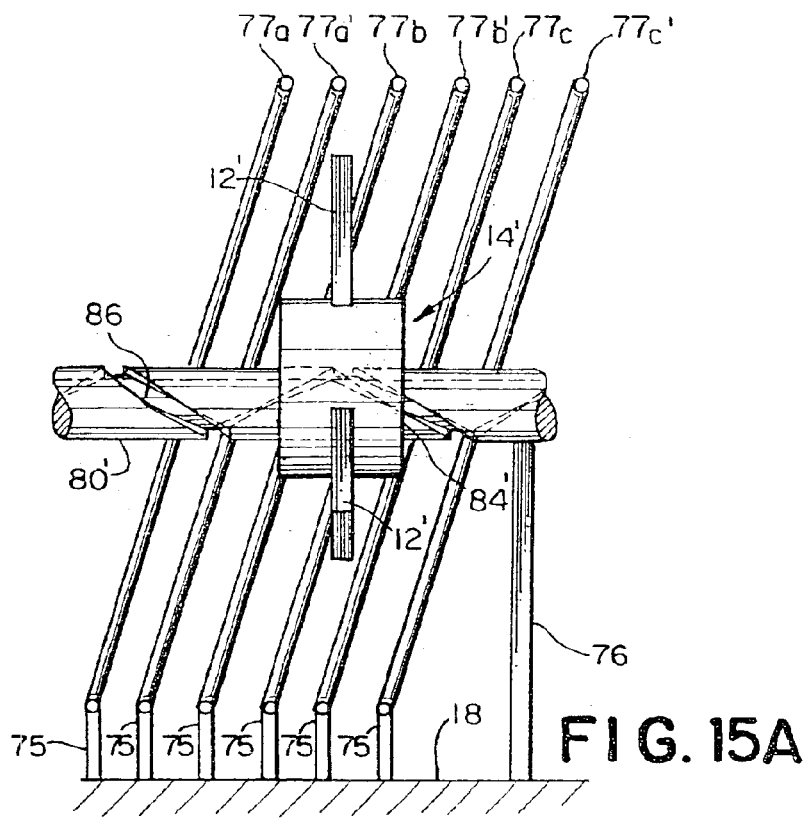
FIG. 15A is an elevational view of a portion of a fourteenth preferred embodiment employing spaced apart ribs.
Figure 15B:
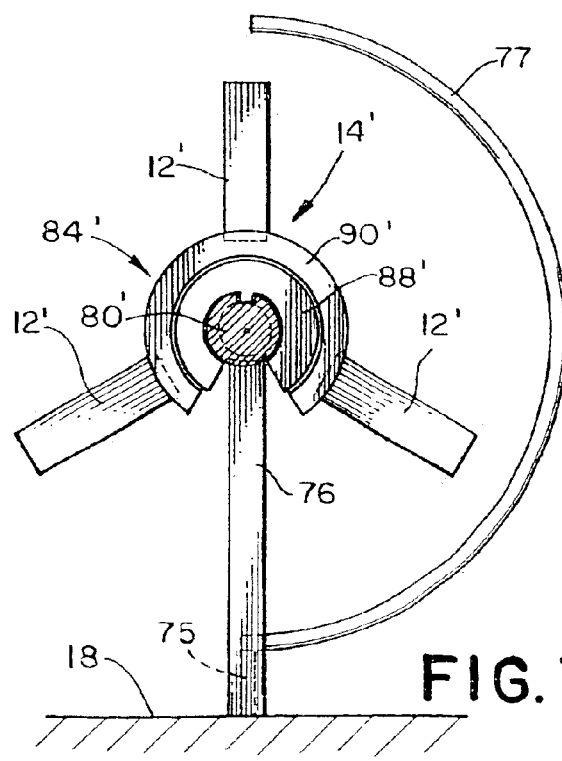
FIG. 15B is an end elevational view of the fourteenth embodiment shown in FIG. 15A.

Referring now to FIGS. 15A and 15B there is shown a fourteenth preferred embodiment of the motor 10. The fourteenth embodiment is identical in structure to the thirteenth preferred embodiment except that the stator comprises a plurality of first ribs 77a, 77b, 77c (77) and second ribs 77a', 77b', 77c' (77') in place of the first and the second helical stators 82, 82' of the thirteenth embodiment. By substituting ribs 77, 77' for the helical stators 82, 82', the attachment of the armature 70 to the rotors 12 is simplified. As those skilled in the art will appreciate, the length of the ribs 77, 77' may vary from as little as 45 degrees to up to 265 degrees, with the motive power of the motor 10 being proportional to the length of the ribs.

Preferably, the first and the second ribs 77, 77' have a pitch and a spacing that conforms to the pre-determined pitch of the rail 80'. Further the orientation of the first and second stator magnets 11, 11' and of the U-shaped rotor magnets 20 would be identical to the thirteenth embodiment. Accordingly, the operation of the fourteenth embodiment is identical to that of the thirteenth embodiment and is not repeated here for the sake of brevity.

Figure 16:
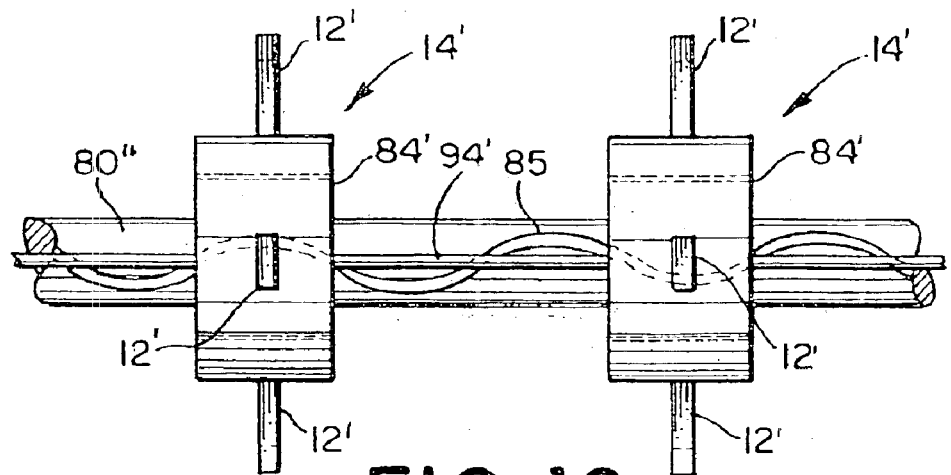
FIG. 16 is a top plan view of a portion of the fifteenth preferred embodiment of the motor.
Figure 17:
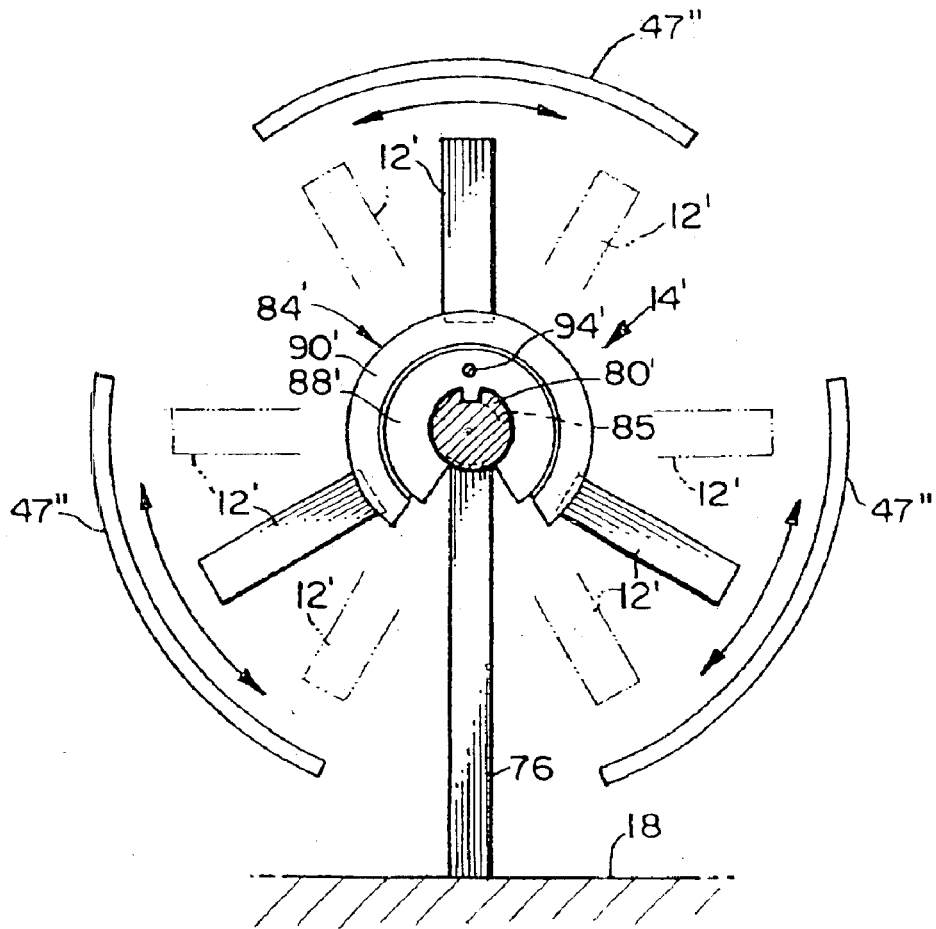
FIG. 17 is an elevational end view of the fifteenth preferred embodiment shown in FIG. 16.

Referring now to FIGS. 5, 16 and 17 there is shown a fifteenth preferred embodiment of the motor 10 comprising a rail 80" having a longitudinal axis 65 and a generally sinusoidal groove 85 having a pre-determined period ruing around a periphery of the rail 80".

Preferably, the fifteenth preferred embodiment includes three generally identical stators 50" arrayed in a circular fashion around the rail 80". Each stator 50" has a surface 64 facing the rail 80" and disposed generally equidistant from and parallel to the axis 65 of the rail 80". As shown in FIGS. 5 and 17 each stator 50" has a generally arcuate cross-section and a longitudinal line of demarcation 49 perpendicular to the cross-section and located about a midpoint of the surface 64.

A plurality of stator magnets 68" are attached to the surface 64 of the stator 50" generating a first magnetic field. The stator magnets 68" are displaced on the surface 64 in a sinusoidal pattern around the line of demarcation 49. The sinusoidal pattern has a predetermined period and a predetermined maximum (peak) amplitude along the line of demarcation 49. In the case where the rail 80' and the longitudinal line of demarcation 49 of the stator 50' are in a straight line, the period of the sinusoid is preferably equal to the period of the groove 85 on the rail 80.

The sinusoidal pattern is also divided into a plurality of first and second alternating sectors with a boundary between the alternating sectors occurring at each maximum (peak) amplitude of the sinusoid. The direction of magnetization of the stator magnets 68" is opposite in the first and the second segments such that the direction of the first magnetic field in each first segment is opposite to the direction of the first magnetic field in each second segment. Preferably, the direction of magnetization of the stator magnets 68" is generally perpendicular to a radial line of the rotor 12. Alternatively, the direction of magnetization of the stator magnets 68" could be generally aligned with a radial line of the rotor 12. Further, as will be apparent to those skilled in the art, the first magnetic field need not be formed by a plurality of bar magnets but could be formed from a single magnet such that the first magnetic field would be sinusoidally displaced from the line of demarcation 49 and would alternate in opposite directions between the peaks of the sinusoid. Further, as will be appreciated by those skilled in the art, the displacement of the first magnetic field need not be precisely sinusoidal. For instance the displacement may be in a shape of a sawtooth or in a shape having a portion with constant plus and minus amplitude values, within the spirit and scope of the invention.

Preferably, the fifteenth preferred embodiment includes five rotors 12, each rotor 12 having an axis 16 aligned with the axis of the rail 80". Each rotor 12 is connected to the rail 80" by a bearing assembly 84' such that the rotor 12 is free to rotate about the axis of the rail 65 and slide along the rail 80". Preferably, each rotor 12 includes three U-shaped magnet pairs 32, 32' 32", each pair comprising two U-shaped magnets 20. Each U-shaped magnet 20 has a rear side and generates a second magnetic field. Each of the U-shaped magnet pairs 32, 32', 32" is positioned on each rotor 12 such that the rear side 26 of each U-shaped magnet 20 is apposite to the first and the second segments of the sinusoidal pattern as the at least one rotor assembly 14 rotates about the rotor axis 16, wherein an interaction of a portion of the second magnetic field directly adjacent to the rear 26 of each U-shaped magnet 20 with the first magnetic field of a corresponding stator 50" causes the at least one rotor 12 to rotationally oscillate about the axis 65 of the rail 80". Those skilled in the art will appreciate that it is not necessary to have three pairs of U-shaped magnets 32, 32', 32". For instance, the number of U-shaped magnets 20 (or groups of abutted U-shaped magnets) spaced apart around the periphery of the rotor 12 may range from merely a single U-shaped magnet 20, or may range in number up to a number of magnets limited only by the physical space around the periphery of the rotor 12. Further the number of abutted U-shaped magnets 20 in a group of magnets 32 may also range from 1 up to a number of magnets limited only by the physical space around the periphery of the rotor 12. Preferably, the number of stators 50" equals the number of U-shaped magnet pairs 32, 32', 32". However, as will be appreciated by those skilled in the art, the number of stators 50" is not limited to three but could be any number ranging upward from one, where the number of stators 50" would preferably equal the number of U-shaped magnet pairs 32, 32, 32".

As shown in FIG. 16 the bearing assembly 84' converts the oscillatory motion of the at least one rotor 12 about the rail to unidirectional linear motion along the rail 80' by following the sinusoidal groove 85 in the rail 80' with the boss 92 (shown in FIG. 11B). A cross-link 94 connects the bearing assembly 84' of adjacent rotors 12 together, thereby adding together the linear motion of each rotor assembly 14' along the rail to provide the unidirectional linear motive power. The structure of the bearing assembly 84' and the cross-link 94 is shown in FIGS. 11B and 12, and the operation is identical to the linkage 84' and the cross-link 94' described for the twelfth embodiment. Accordingly, a detailed description of the linkage 84' and the cross-link 94 is not repeated, for the sake of brevity.

In another aspect, the fifteenth preferred embodiment may also be configured in a circular arrangement similar to that of the fourteenth embodiment. In the fifteenth preferred embodiment, the helical stator 82' shown in FIG. 14 is replaced with one or more arcuate stators 50'' spaced around the rotors 12. In this case, the period of the sinusoidal pattern of the stator magnets is adjusted in accordance with the distance of the surface 64 of the respective stator 50'' from the armature axis of rotation 58 in order that the U-shaped magnets 20 on the rotors 12 remain apposite to the first and the second segments, as the rotors 12 slide along the rail 80''. Accordingly, a description of those elements of circular arrangement of the fifteenth embodiment which are the same as for the linear embodiment are not repeated, for the sake of brevity.

Figure 18:
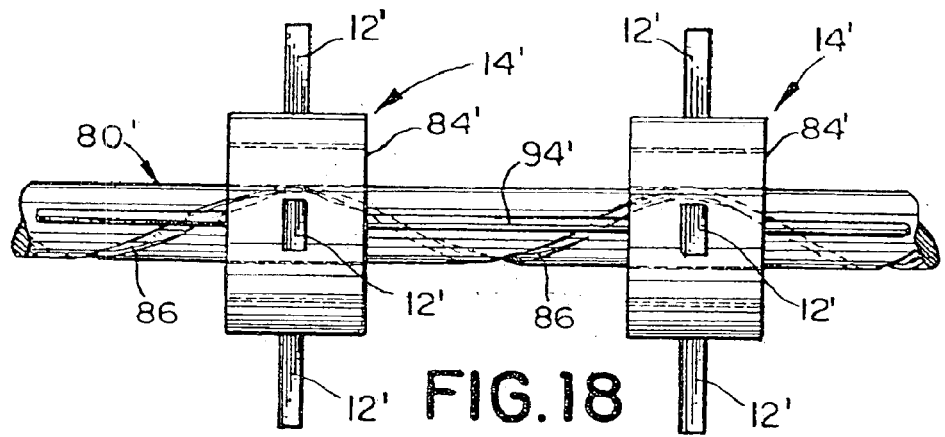
FIG. 18 is a top plan view of a portion of the sixteenth preferred embodiment of the motor.
Figure 19:
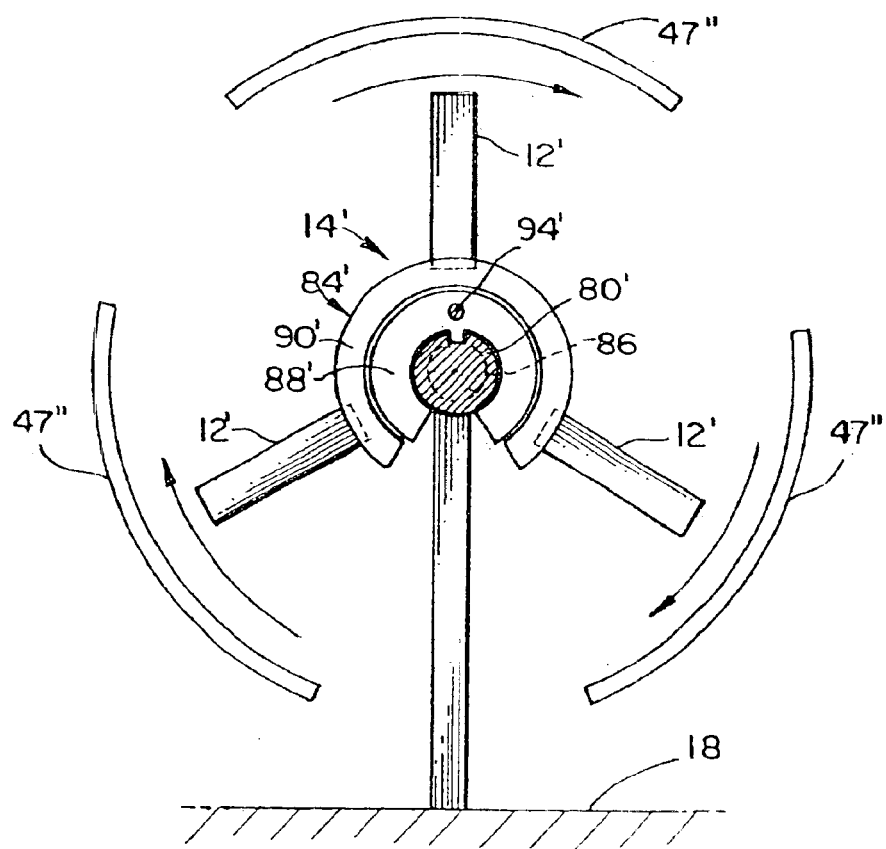
FIG. 19 is an elevational end view of the sixteenth preferred embodiment of the motor shown in FIG. 18.

Referring now to FIGS. 4, 18 and 19 there is shown a sixteenth preferred embodiment of the motor 10 for providing unidirectional motive power comprising a rail 80' having a longitudinal axis 65 and a helical groove 86 having a pre-determined pitch, running around a periphery of the rail 80.

Preferably, the sixteenth preferred embodiment further includes three generally identical stators 50', each stator 50' having a surface 64 disposed generally equidistant from and parallel to the axis 65 of the rail 80. Each stator 50' has a longitudinal line of demarcation 49 located about a midpoint of the surface 64. Preferably, a plurality of stator magnets 68' are attached to the surface of the stator 50' generating a first magnetic field. The plurality of stator magnets 68' have a direction of magnetization which rotates about a magnetic axis parallel to the line of demarcation 49. In the case where the rail 80'' and the longitudinal line of demarcation 49 of the stator 50' are in a straight line, the pitch of the rotation of the stator magnets 68' is preferably equal to the predetermined pitch of the helical groove 86 on the rail 80.

The sixteenth embodiment further includes five rotors 12, each rotor 12 having an axis of rotation 16 aligned with the axis 65 of the rail 80. Each rotor 12 is connected to the rail 80 such that the rotor 12 is free to rotate about the axis 65 of the rail 80 and slide along the rail 80. Each rotor 12 includes three pairs 32, 32', 32'' of U-shaped magnets 20 spaced around the periphery of the rotor 12, each U-shaped magnet 20 generating a second magnetic field. The U-shaped magnets 20 are positioned on each rotor 12 such that a portion of the second magnetic field directly adjacent to the rear side 26 of the U-shaped magnet 20 interacts with the first magnetic field generated by the plurality of stator magnets 68' to cause each rotor 12 to rotate about the rotor axis 16. Those skilled in the art will appreciate that it is not necessary to have exactly three pairs of U-shaped magnets 32, 32', 32''. For instance, the number of U-shaped magnets 20 (or groups of abutted U-shaped magnets) spaced apart around the periphery of the rotor 12 may range from merely a single U-shaped magnet 20, or may range in number up to a number of U shaped magnets 20 limited only by the physical space around the periphery of the rotor 12. Further the number of abutted U-shaped magnets 20 in a group of magnets 32 may also range from 0.1 up to a number of magnets limited only by the physical space around the periphery of the rotor 12.

The sixteenth embodiment also includes a bearing assembly 84' connecting each rotor 12 to the helical groove 86, the bearing assembly 84' converting the rotary motion of each rotor 12 about the rail 80' to unidirectional linear motion along the rail 80'. A cross-link 94 connects the bearing assembly 84' of adjacent rotors 12 together, thereby adding together the linear motion of each rotor assembly 14' along the rail 80' to provide the unidirectional linear motive power. The structure of the bearing assembly 84' and the cross-link 94 is shown in FIGS. 11B and 12, is identical to the bearing assembly 84' and cross-link 94 described for the twelfth embodiment Accordingly, a description of the linkage 84 and the cross-link 94 is not repeated, for the sake of brevity.

In another aspect of the sixteenth preferred embodiment the motor 10 may be configured in a circular arrangement similar to that of the fourteenth embodiment, as shown in FIG. 14, except that the helical stator 82' shown in FIG. 14 is replaced with one or more stators 50' spaced around the rotors 12. In this case, the pitch of the rotation of the plurality of stator magnets 68' is adjusted in accordance with the distance of the surface 64 of the respective stator 50' from the armature axis of rotation 58 in order that the U-shaped magnets 20 on the rotors 12 remain aligned with the plurality of stator magnets 68' as the rotors 12 rotate about the axis 65 of the rail 80' and slide along the rail 80'. Accordingly, a description of those elements of the circular arrangement of the sixteenth embodiment which are the same as for the straight line configuration are not repeated, for the sake of brevity.

It will be appreciated by those skilled in the art that changes could be made to the embodiments described above without departing from the broad inventive concept thereof.

It is understood, therefore, that this invention is not limited to the particular embodiments disclosed, but it is intended to cover modifications within the spirit and scope of the present invention as defined by the appended claims.

I claim:

1. An apparatus (10, 10') characterized by:
   at least one rotor (12) having a periphery and a rotor axis (16), the at least one rotor (12) comprising a first rotor magnet (20) producing a first magnetic field, said first rotor magnet being U-shaped and having a north pole (23), a south pole (25) and a rear side (26), the rear side (26) of the first rotor magnet being adjacent to the periphery;
   an axle (80) to which the at least one rotor (12) is connected at the rotor axis (16) for rotation of the at least one rotor (12) about the rotor axis (16); and
   a stationary stator (48, 51) comprising a generally arcuate cross-section, said stator (51) having a surface (64) opposing the periphery of the at least one rotor (12), and a longitudinal line of demarcation (49) perpendicular to the cross-section at about a midpoint of the surface, the line of demarcation (49) delineating a first side (52) of the surface from a second side (54) of the surface (64), wherein a plurality of pairs of stator magnets (40, 42) producing a second magnetic field are attached to the surface (64), each pair of stator magnets (40, 42) comprising a first stator magnet (40) having a north pole and a south pole and a direction of magnetization substantially parallel to the surface (64), and a second stator magnet (42) having a north pole and a south pole and a direction of magnetization substantially parallel to the surface (64), the first stator magnet (40) being on the first side of the surface (64) with the north pole of the first stator magnet being closest to the line of demarcation (49), the second stator magnet (42)

being on the second side (52) of the surface with the south pole of the second stator magnet (42) being closest to the line of demarcation (49), wherein the plurality of pairs of stator magnets (40, 42) are spaced along the line of demarcation (49) such that a first intermagnet distance measured along the line of demarcation (49) between the north pole of the first stator magnet (40) and the south pole of the second stator (42) magnet of an adjacent pair of stator magnets (40, 42) is about equal to a second intermagnet distance measured along the line of demarcation between the south pole of the first stator magnet (40) and the north pole of the second stator magnet (42), and wherein the interaction of the first and the second magnetic fields cause the at least one rotor (12) to translate in a predetermined direction along the line of demarcation.

2. The apparatus (10, 10') of claim 1, characterized by the north pole of each first stator magnet (40) and the south pole of each second stator magnet (42) being inclined toward the predetermined direction.

3. The apparatus (10, 10') of claim 1, further characterized by the rotor (12) including a second rotor magnet (22), said second rotor magnet (24) being U-shaped and having a north pole, a south pole and a rear side, the south pole of the second rotor magnet (22) abutting the north pole of the first rotor magnet (26) and the north pole of the second rotor magnet being adjacent to the periphery, and a third rotor magnet (24), said third rotor magnet (24) having a north pole, a south pole and a rear side, the north pole of the third rotor magnet (24) abutting the south pole of the first rotor magnet (26) and the south pole of the third rotor magnet (24) being adjacent to the periphery, said second magnet producing a third magnetic field and third magnet producing a fourth magnetic field.

4. The apparatus (10) of claim 1, characterized by the apparatus further including an armature (70) having an armature axis (58), the at least one rotor (12) being spaced from the armature (70) by an armature strut (71) and connected thereto by the axle (80) for rotation about the rotor axis (16), the at least one rotor (12) configured for rotation in a plane generally aligned with the armature axis (58), wherein the stator (51) is circular-cylindrical, with a stator axis (72) aligned with the armature axis (58).

5. The apparatus (10') of claim 1, further characterized by the stator (48) being linear, the stator (48) oriented such that the surface (64) of the stator (48) is generally parallel to the axle (80), each at least one rotor (12) being connected to the axle (80) by a bearing assembly (84) comprising a pair of first bearings (88) slidably attached to the axle (80), and a second bearing (90) connected to the pair of first bearings (88) for rotation about the first pair of bearings (88), said at least one rotor (12) being fixedly attached to the second bearing (90).

6. The apparatus (10') of claim 5, further characterized by a crosslink (94) which connects together the at least one rotors (12).

7. A apparatus (10, 10') characterized by:
at least one rotor (12) having a periphery, a rotor axis (16) and a thruster axis (34) perpendicular to the rotor axis (16) and intersecting the rotor axis (16), the at least one rotor (12) comprising spaced apart first and second rotor magnets (36, 38) having north and south poles aligned with the thruster axis (34), and a third rotor magnet (20, 20') located between the first and second rotor magnets (34, 38) on an axis generally perpendicular to the thruster axis (34), said first, second and third magnets producing a first magnetic field;

an axle (80) to which the at least one rotor (12) is connected at the rotor axis (16) for rotation of the at least one rotor (12) about the rotor axis (16); and a stationary stator (48', 51') comprising a generally arcuate cross-section, said stator (48', 51') having a surface 64 opposing the periphery of the at least one rotor (12), and a longitudinal line of demarcation (49) perpendicular to the cross-section at about a midpoint of the surface (64), the line of demarcation (49) delineating a first side (52) of the surface from a second side (54) of the surface, wherein a plurality of sets of stator magnets (40', 42', 41) producing a second magnetic field are attached to the surface (64), each set of stator magnets (40', 42', 41) comprising a first stator magnet (40') having a north pole and a south pole and a direction of magnetization substantially perpendicular to the surface (64), a second stator magnet (42') having a north pole and a south pole and a direction of magnetization substantially perpendicular to the surface (64), and a third stator magnet (41), the third stator magnet (41) being attached to the stator (48', 51') along the line of demarcation (49) midway between the first stator magnet (40') and the second stator magnet (42'), the first stator magnet (40') being on the first side (52) of the surface with the south pole of the first stator magnet (40') being closest surface (64), the second stator magnet (42') being on the second side (54) of the surface (64) with the north pole of the second stator magnet (42') being closest to the surface (64), wherein the plurality of sets of stator magnets (40', 42', 41) are spaced along the line of demarcation (49) such that a first intermagnet distance measured along the line of demarcation (49) between the north pole of the first stator magnet (40') and the south pole of the second stator magnet (42') of an adjacent pair of stator magnets (40', 42', 41) is about equal to a second intermagnet distance measured along the line of demarcation (49) between the south pole of the first stator magnet (40') and the north pole of the second stator magnet (42'), wherein the interaction of the first and the second magnetic fields cause the at least one rotor (12) to translate in a predetermined direction along the line of demarcation.

8. The apparatus (10, 10') of claim 7, characterized by the third rotor magnet (20) being a U-shaped magnet and the third stator magnet (41) being a bar magnet.

9. The apparatus (10, 10') of claim 7, characterized by the third rotor magnet (20') being a bar magnet and the third stator magnet (41') being a U-shaped magnet.

10. The apparatus (10) of claim 7, characterized by the apparatus further including an armature (70) having an armature axis (58), the at least one rotor (12) being spaced from the armature (70) by an armature strut (71) and connected thereto by the axle (80) for rotation about the rotor axis (16), the at least one rotor (12) being configured for rotation in a plane generally aligned with the armature axis (58), wherein the stator (51') is circular, with a stator axis (72) aligned with the armature axis (58).

11. The apparatus (10') of claim 7, further characterized by the stator (48') being linear, the stator (48') oriented such that the surface (64) of the stator (48') is generally parallel to the axle (80), each at least one rotor (12) being connected to the axle (80) by a bearing assembly (84) comprising a pair of first bearings (88) slidably attached to the axle (80), and a second bearing (90) connected to the pair of first bearings (88) for rotation about the pair of first bearings (88), said at least one rotor (12) being fixedly attached to the second bearing (90).

12. The apparatus (10') of claim 11, further characterized by a crosslink (94) which connects together the at least one rotors (12).

13. An apparatus (10) for providing motion characterized by:
- a stationary, generally circular, stator (50, 50', 50") having a stator axis (58), an outer surface (64), and a circumferential line of demarcation (49) in a plane perpendicular to the stator axis (58) at about a midpoint of the outer surface (64);
- at least one stator magnet (68, 68', 68") attached to the outer surface (64) of the stator (50, 50', 50"), the at least one stator magnet (68, 68', 68") being arranged in a generally circular arrangement about the stator axis (58);
- an armature (70) attached to the stator (50, 50", 50"') for rotation therewith, the armature (70) having an axis parallel to the stator axis (58);
- at least one rotor (12) including at least one rotor magnet (20), the at least one rotor (12) being spaced from the armature (70) by an armature strut (71) and connected thereto by an axle (80) for rotation about a rotor axis (16), the at least one rotor (12) being configured for rotation in a plane generally aligned with the stator axis (58); and
- a linkage assembly (53, 55, 62) drivingly connecting the at least one rotor to the stator, the linkage assembly (53, 55, 62) configured to cause the armature (70) to rotate about the stator axis (58) when the at least one rotor (12) rotates about the rotor axis (16).

14. The apparatus according to claim 13 wherein a direction of magnetization of the at least one stator magnet (68) is generally perpendicular to a radial line of the at least one rotor (12).

15. The apparatus according to claim 13 wherein a direction of magnetization of the at least one stator magnet (68) is generally aligned with a radial line of the at least one rotor (12).

16. The apparatus according to claim 13 wherein the at least one rotor magnet (20) comprises a U-shaped magnet.

17. The apparatus according to claim 13 wherein the at least one rotor magnet (20) comprises a bar magnet and the at least one stator magnet (68) is a U-shaped magnet.

18. The apparatus according to claim 13, the at least one stator magnet (68') having a direction of magnetization which rotates about the circumferential line of demarcation (49) with a pre-determined periodicity.

19. The apparatus according to claim 13, the at least one stator magnet (68") having a direction of magnetization in a plane of the stator (50") and which is displaced in a sinusoidal pattern from the line of demarcation (49), the sinusoidal pattern having a pre-determined period and a pre-determined maximum amplitude and divided into a plurality of alternating first and second sectors with a boundary between the alternating first and second sectors occurring at peak amplitudes of the sinusoid, the direction of magnetization of the at least one magnet (68") being opposite in direction in the first and the second segments.

* * * * *